US012703426B2

(12) United States Patent
Urushibata

(10) Patent No.: US 12,703,426 B2
(45) Date of Patent: Aug. 11, 2026

(54) IMPACT ABSORBING STRUCTURE OF AUTOMOBILE

(71) Applicant: NIPPON STEEL CORPORATION, Tokyo (JP)

(72) Inventor: Ryo Urushibata, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 407 days.

(21) Appl. No.: 18/281,467

(22) PCT Filed: Apr. 14, 2022

(86) PCT No.: PCT/JP2022/017817
§ 371 (c)(1),
(2) Date: Sep. 11, 2023

(87) PCT Pub. No.: WO2022/220283
PCT Pub. Date: Oct. 20, 2022

(65) Prior Publication Data

US 2024/0149947 A1 May 9, 2024

(30) Foreign Application Priority Data

Apr. 14, 2021 (JP) ................................ 2021-068519

(51) Int. Cl.
*B62D 21/15* (2006.01)
*B60R 19/34* (2006.01)

(52) U.S. Cl.
CPC .............. *B62D 21/15* (2013.01); *B60R 19/34* (2013.01)

(58) Field of Classification Search
CPC ...... B60R 19/34; B62D 21/15; B62D 21/152; F16F 7/12
See application file for complete search history.

(56) References Cited

U.S. PATENT DOCUMENTS 4,272,114 A * 6/1981 Hirano .................... B60R 19/34 293/133
2011/0233947 A1 9/2011 Baccouche et al.
(Continued)

FOREIGN PATENT DOCUMENTS

DE 43 00 284 C2 10/2003
JP 2001-219226 A 8/2001
(Continued)

OTHER PUBLICATIONS

SU 984598 A with English Abstract (Year: 1983).*

*Primary Examiner* — Lori Lyjak
(74) *Attorney, Agent, or Firm* — Birch, Stewart, Kolasch & Birch, LLP

(57) ABSTRACT

An impact absorbing structure includes: a first member composed of a metallic material; and a second member extending in an axial direction of the first member, wherein: a shape of the first member is a cylindrical shape; a length of the second member in the axial direction is a length of 15 to 75% of a length in the axial direction of the first member; when a distance between end portions of the first member and the second member is set as D, a maximum curvature radius of the first member is set as R, and a sheet thickness of the first member is set as t, D<0.40Rt is satisfied; and a joint line, extending along a direction different from a circumferential direction of the first member, of the first member and the second member is present.

13 Claims, 28 Drawing Sheets

(56) References Cited

U.S. PATENT DOCUMENTS

| | | | | |
|---|---|---|---|---|
| 2014/0147693 | A1* | 5/2014 | Yasuyama | B32B 3/00 428/603 |
| 2016/0245357 | A1 | 8/2016 | Cazes et al. | |
| 2019/0039653 | A1* | 2/2019 | Otsuka | B62D 25/00 |

FOREIGN PATENT DOCUMENTS

| | | | |
|---|---|---|---|
| JP | 2001-241478 | A | 9/2001 |
| JP | 2004-28135 | A | 1/2004 |
| JP | 2016-533939 | A | 11/2016 |
| JP | 2017-227276 | A | 12/2017 |

* cited by examiner (a)

(b)

(c)

(d)

(a)

(b)

(a)

(b)

(a) FIRST MEMBER (CYLINDER) ONLY
(b) NO JOINING
(c) ONE JOINT LINE IN AXIAL DIRECTION
(d) EIGHT JOINT LINES IN AXIAL DIRECTION
(e) JOINING OVER ENTIRE SURFACE

FIG.38

| JOINT POSITION OF SECOND MEMBER | SIMULATION RESULT |
| --- | --- |
| (a) $W_p'/W_p = 0.75$<br>10 20 20 20 20 | 10a 10 20 20 10b |
| (b) $W_p'/W_p = 0.40$<br>10 20 20 20 20 | 10a 10 20 20 10b |
| (c) $W_p'/W_p = 0.15$<br>10 20 20 20 20 | 10a 10 20 20 10b |

FIG.39

| JOINT POSITION OF SECOND MEMBER | SIMULATION RESULT |
|---|---|
| 10, 20, 20 | 10a, 10, 20, 10b |
| 10, 20, 20 | 10a, 10, 20, 20, 10b |

FIG.40

| JOINT POSITION OF SECOND MEMBER | SIMULATION RESULT |
| --- | --- |
| (a) Wr'/Wr =1.00<br>20 10 20<br>20 20 | 10a<br>10<br>20<br>20<br>10b |
| (b) Wr'/Wr =0.60<br>20 10 20<br>20 20 | 10a<br>10<br>20<br>20<br>10b |
| (c) Wr'/Wr =0.20<br>20 10 20<br>20 20 | 10a<br>10<br>20<br>20<br>10b |

FIG.41

| JOINT POSITION OF SECOND MEMBER | SIMULATION RESULT |
| --- | --- |
| 20, 10, 20 | 10a, 20, 10, 20, 10b |
| 20, 10, 20 | 10a, 20, 10, 20, 10b |

IMPACT ABSORBING STRUCTURE OF AUTOMOBILE

TECHNICAL FIELD

The present invention relates to an impact absorbing structure of an automobile.

BACKGROUND ART

In recent years, from the viewpoint of global environmental protection, an improvement in automotive fuel consumption is required. Meanwhile, an improvement in automobile collision safety is also required. To improve the collision safety, a front part and a rear part of an automobile which are also each called a "crushable zone" are required to improve collision energy absorption performance to absorb an impact at the time of collision. For example, the crushable zone of the front part mainly consists of a front side member and a crash box disposed at the tip thereof, and these parts absorb the impact in automobile front collision.

From the viewpoint of achieving both weight reduction and impact absorption performance of an automobile body, mass efficiency of an energy absorption amount (hereinafter "energy absorption efficiency") is desirably increased. Further, to increase the energy absorption efficiency effectively, when a collision load is input to an impact absorbing structure such as the crash box or the side member, axial crush deformation preferably progresses from an end portion of the impact absorbing structure on an input side of the load toward an end portion thereof on a vehicle-interior side (passenger section side).

As the impact absorbing structure, Patent Document 1 discloses a collision energy absorbing structure in which first and second cylindrical members having different diameters from each other are integrated with their end portions combined with each other.

Patent Document 2 discloses a high-strength steel pipe for hydroforming which has a multiple tube structure in a part of the entire length. Patent Document 2 discloses a steel pipe having a structure in which an add-on tube is disposed on an inner side of a base tube, and a steel pipe having a structure in which the add-on tube is disposed on an outer side of the base tube.

Patent Document 3 discloses an impact absorber including a partition member joined to a structure targeted for protection from an impact, an outer cylinder member whose base end portion is joined to the partition member, and an inner cylinder member whose base end portion is joined to the partition member, and which is in internal contact with an end portion of the outer cylinder member and whose end portion protrudes from the outer cylinder member.

Patent Document 4 discloses a vehicle shock absorber system including a main unit suited for deformation in an impact at a first energy level, and an auxiliary unit subjected to an impact at a second energy level exceeding the first energy level.

Patent Document 5 discloses an energy absorbing structure including a cylindrical energy absorbing member made of a fiber reinforced resin which crashes in an axial direction to absorb a collision load at the time of load input, a load transfer member disposed on a tip surface side of the energy absorbing member, and wall surface portions provided around a tip portion of the energy absorbing member.

PRIOR ART DOCUMENT

Patent Document

Patent Document 1: Japanese Laid-open Patent Publication No. 2001-241478

Patent Document 2: Japanese Laid-open Patent Publication No. 2001-219226

Patent Document 3: Japanese Laid-open Patent Publication No. 2004-028135

Patent Document 4: Japanese Laid-open Patent Publication No. 2016-533939

Patent Document 5: Japanese Laid-open Patent Publication No. 2017-227276

SUMMARY OF THE INVENTION

Problems to be Solved by the Invention

The collision energy absorbing structure described in Patent Document 1 is constituted by butt-welding end portions of the first cylindrical member and the second cylindrical member to each other. However, the present inventors carried out a crash simulation with a model similar to the structure described in Patent Document 1, resulting in an increase in equivalent plastic strain at a joint portion of the first cylindrical member and the second cylindrical member. Thus, in the structure described in Patent Document 1, there is a fear of fracture at the joint portion at the time of collision, resulting in the possibility that axial crush deformation does not appear. Further, the structure described in Patent Document 1 is necessary to butt-weld the end portion of the first cylindrical member and the end portion of the second cylindrical member, and thus a disposition of a thick portion and a thin portion does not have the degree of freedom.

In the steel pipe described in Patent Document 2 in which the add-on tube is disposed on the "inner side" of the base tube, both ends of the add-on tube are welded to the base tube over their whole circumference to prevent a pressurized liquid from intruding into a gap between the base tube and the add-on tube. When the base tube and the add-on tube are welded over their whole circumference in this manner, a joint portion easily separates at the time of input of an axial load, which causes the possibility that deformation behavior of the base tube exhibits deformation behavior similar to that of a steel pipe having a single pipe structure. Thus, the base tube has the possibility that the axial crush deformation does not appear.

Further, in the steel pipe described in Patent Document 2 in which the add-on tube is disposed on the "outer side" of the base tube, the two tubes are not joined, which causes the possibility that the respective tubes exhibit deformation behavior independent of each other at the time of input of the axial load. Thus, the base tube has the possibility that the axial crush deformation does not appear.

In the impact absorber described in Patent Document 3, the outer cylinder member and the inner cylinder member are circumferentially welded, and thus a joint portion easily separates at the time of input of an axial load similarly to the steel pipe described in Patent Document 2. Further, in rear end portions of the outer cylinder member and the inner cylinder member, a gap is present between the two members, and the cylinder members in the vicinity of this gap portion have the possibility of exhibiting deformation behavior as a single cylinder member at the time of input of the axial load.

This raises the possibility that the axial crush deformation does not appear in the outer cylinder member.

The vehicle shock absorber system described in Patent Document 4 has a structure in which the auxiliary unit is disposed inside the main unit, but an inner surface of the main unit and an outer surface of the auxiliary unit are not joined, which independently deforms the respective units. This causes large buckling in the vicinity of an end portion on a vehicle-interior side (passenger section side) of the main unit at the time of input of an axial load, resulting in the possibility that the axial crush deformation does not appear in the main unit.

In the energy absorbing structure described in Patent Document 5, the energy absorbing member subjected to a load from the load transfer member is made of the fiber reinforced resin, which makes it difficult that the axial crush deformation appears at the time of collision.

In the impact absorbing structures described in Patent Documents 1 to 5 as described above, it is feared that the axial crush deformation does not appear stably, which leaves room for improvement in the viewpoint of improving energy absorption efficiency.

The present invention has been made in consideration of the above circumstances, and has an object to improve the energy absorption efficiency in the impact absorbing structure of the automobile.

Means for Solving the Problems

An aspect of the present invention for solving the above problems is an impact absorbing structure of an automobile, the impact absorbing structure of the automobile includes: a first member composed of a metallic material; and a second member joined to an outer surface or an inner surface of the first member, and extending in an axial direction of the first member, wherein: a shape of the first member is a cylindrical shape; a length of the second member in the axial direction of the first member is a length of 15 to 75% of a length in the axial direction of the first member; when a distance between end portions of the first member and the second member in the axial direction of the first member is set as D, a maximum curvature radius of the first member in a cross section perpendicular to the axial direction of the first member is set as R, and a sheet thickness of the first member is set as t, $D<0.40Rt$ is satisfied; and a joint line, extending along a direction different from a circumferential direction of the first member, of the first member and the second member is present.

A shape of the second member may be a cylindrical shape.

An area of a region divided by the joint line in the second member may be 60% or less of a total area of the regions.

Further, an aspect of the present invention according to another viewpoint is an impact absorbing structure of an automobile, the impact absorbing structure of the automobile includes: a first member composed of a metallic material; and a second member joined to an outer surface or an inner surface of the first member, and extending in an axial direction of the first member, wherein: a shape of the first member is a square tube shape; a length of the second member in the axial direction of the first member is a length of 15 to 75% of a length in the axial direction of the first member; when a distance between end portions of the first member and the second member in the axial direction of the first member is set as D, a width of a flat surface portion of the first member is set as $W_p$, and a sheet thickness of the first member is set as t, $D<1.11W_pt$ is satisfied; and a joint line, extending along a direction different from a circumferential direction of the first member, of the first member and the second member is present.

The second member may be joined to the flat surface portion of the first member.

The second member may be joined to a ridge line portion of the first member.

The joint line may extend along the axial direction of the first member.

The joint line may extend in a direction inclined to the axial direction of the first member.

Another joint line extending along the circumferential direction of the first member may be present.

A thickness ratio t/t' between the sheet thickness t of the first member and a sheet thickness t' of the second member may be 0.25 to 4.0.

The impact absorbing structure may be used for a crash box, a side member, an extension of a subframe, or a reinforcement disposed in a hollow crushing member.

Effect of the Invention

In the impact absorbing structure of the automobile, it is possible to improve the energy absorption efficiency.

BRIEF DESCRIPTION OF THE DRAWINGS

FIG. 38 are views illustrating deformed states of analysis models in a simulation (7).

FIG. 39 is views illustrating deformed states of analysis models in a simulation (8).

FIG. 40 are views illustrating deformed states of analysis models in a simulation (9).

FIG. 41 is views illustrating deformed states of analysis models in a simulation (10).

EMBODIMENTS FOR CARRYING OUT INVENTION

Figure 1:
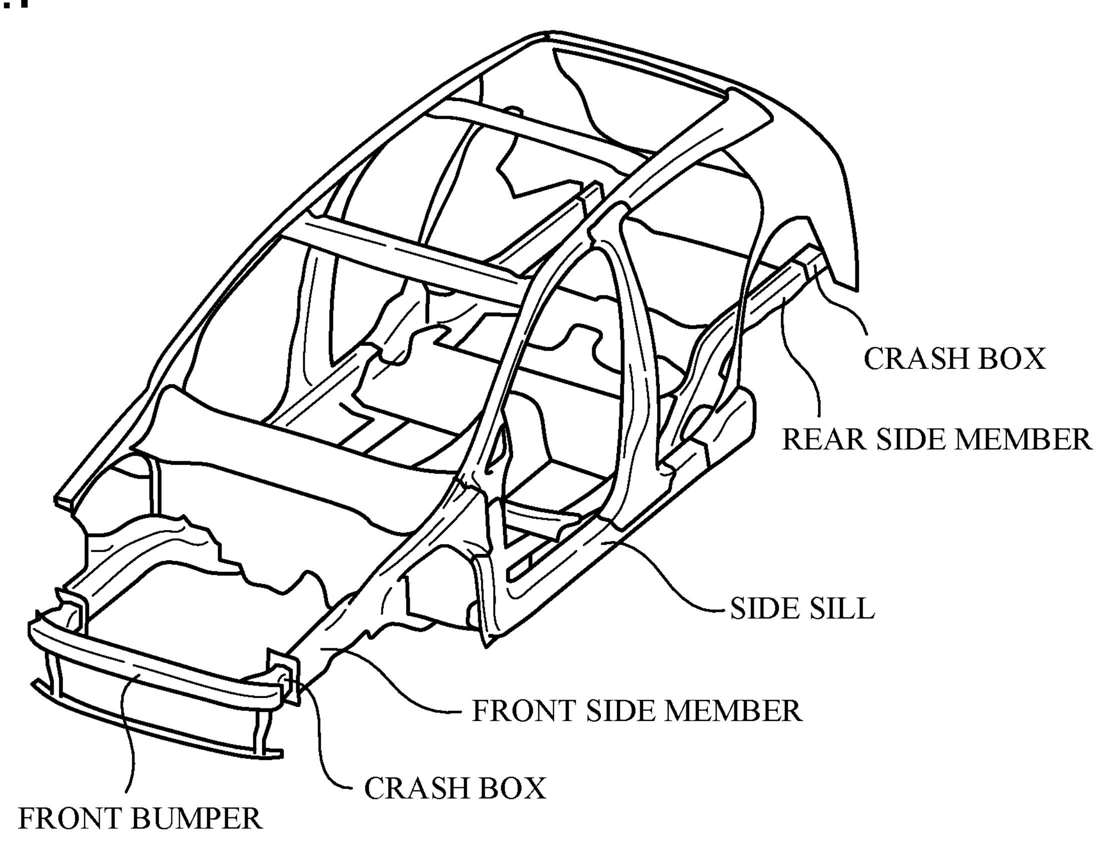
FIG. 1 is a view illustrating one example of a body framework of an automobile.

Hereinafter, embodiments of the present invention will be described while referring to the drawings. Note that in the present description and the drawings, elements having substantially the same functional configurations are denoted by the same codes to omit overlapped explanation.

Figure 2:
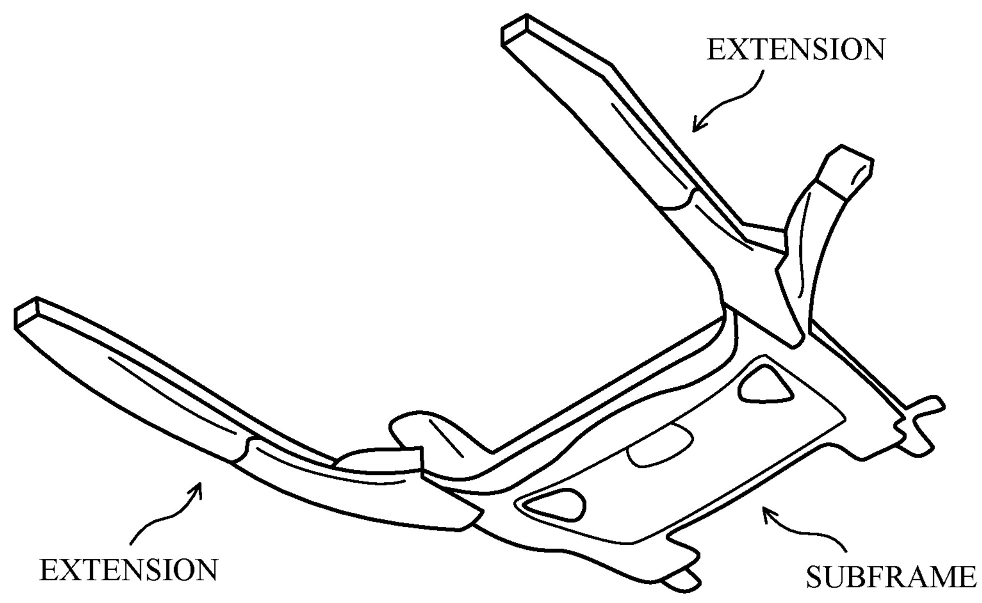
FIG. 2 is a view illustrating one example of a subframe of the automobile.

Impact absorbing structures of an automobile according to the following embodiments are applied as, for example, a crash box or a side member as illustrated in FIG. 1, an extension of a subframe as illustrated in FIG. 2, or a reinforcement disposed in a hollow crushing member. Note that concrete examples for the application of the impact absorbing structure to the crash box or the side member and for the application of the impact absorbing structure as the reinforcement in the hollow crushing member will be described later.

First Embodiment

Figure 3:
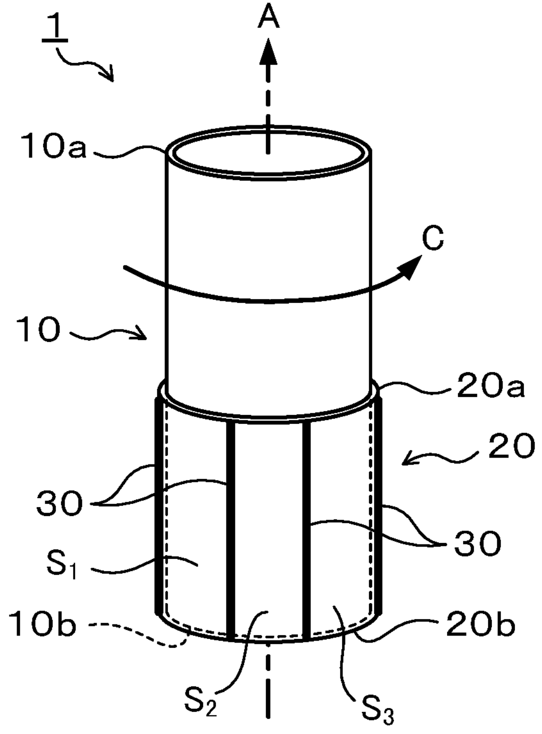
FIG. 3 is an explanatory view illustrating a schematic configuration of an impact absorbing structure according to a first embodiment.
Figure 4:
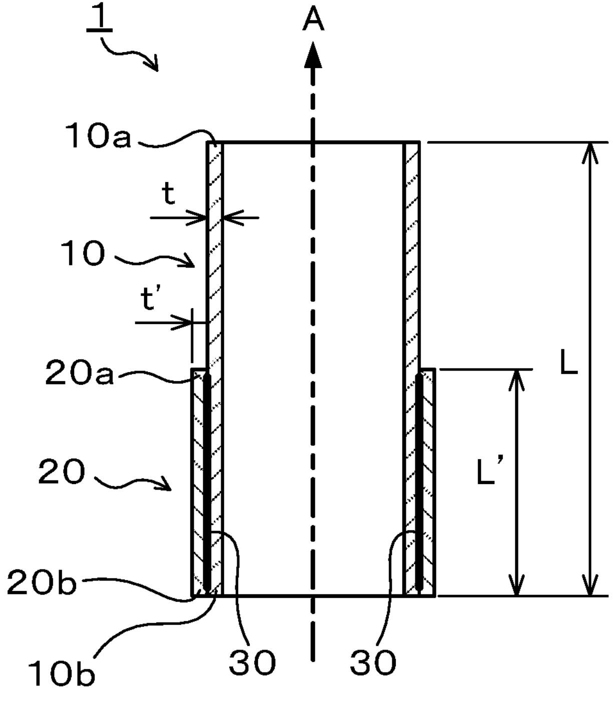
FIG. 4 is a sectional view of the impact absorbing structure taken along an axial direction.
Figure 5:
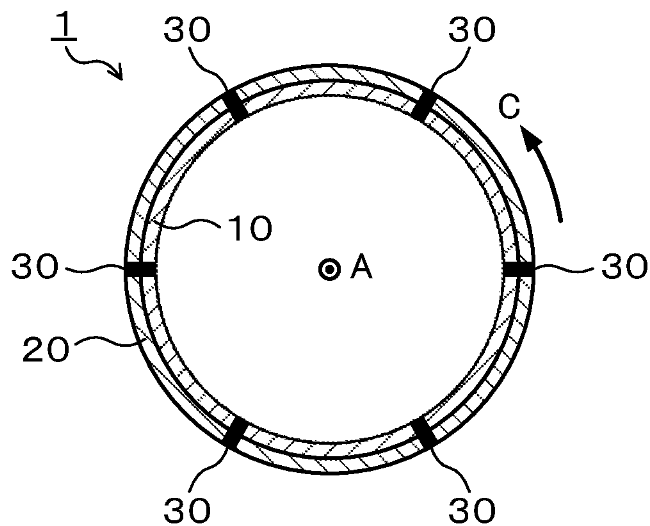
FIG. 5 is a sectional view of the impact absorbing structure taken perpendicularly to the axial direction.

FIG. 3 is an explanatory view illustrating a schematic configuration of an impact absorbing structure 1 according to a first embodiment. FIG. 4 is a sectional view of the impact absorbing structure 1 taken along an axial direction A. FIG. 5 is a sectional view of the impact absorbing structure 1 taken perpendicularly to the axial direction A, and illustrates a cross section of a portion on which a first member 10 and a second member 20 are overlapped. Note that an upper side of the impact absorbing structure 1 in FIG. 3 and FIG. 4 is a vehicle-exterior side and a lower side thereof is a vehicle-interior side (passenger section side), in a vehicle length direction of an automobile.

As illustrated in FIG. 3 to FIG. 5, the impact absorbing structure 1 has the first member 10 in a cylindrical shape and the second member 20 in a cylindrical shape.

The first member 10 is composed of, for example, a metallic material such as a steel material, an aluminum alloy member, or a magnesium alloy member. When the steel material is used as the metallic material of the first member 10, a steel sheet having a tensile strength of 780 MPa or more is preferably used, and a steel sheet having a tensile strength of 980 MPa or more is more preferably used.

A length in the axial direction A of the first member 10 is, for example, 150 to 1000 mm. This length in the axial direction of the first member 10 is preferably 500 mm or less, and more preferably 300 mm or less.

A sheet thickness of the first member 10 is, for example, 0.5 to 6.0 mm. This sheet thickness of the first member 10 is preferably 0.8 mm or more, and more preferably 1.0 mm or more. Meanwhile, the sheet thickness of the first member 10 is preferably 4.0 mm or less, and more preferably 3.0 mm or less.

The second member 20 is composed of, for example, the metallic material such as the steel material, the aluminum alloy member, or the magnesium alloy member, or, various resin materials such as a fiber reinforced resin. When the steel material is used as the metallic material of the second member 20, the steel sheet having the tensile strength of 780 MPa or more is preferably used, and the steel sheet having the tensile strength of 980 MPa or more is more preferably used.

A length of the second member 20 in the axial direction A is not particularly limited, but is shorter than the length in the axial direction of the first member 10 as described later. Note that the length in the axial direction of the second member 20 is, for example, 150 to 1000 mm, and preferably 500 mm or less and more preferably 300 mm or less.

A sheet thickness of the second member 20 is, for example, 0.5 to 6.0 mm. This sheet thickness of the second member 20 is preferably 0.8 mm or more, and more preferably 1.0 mm or more. Meanwhile, the sheet thickness of the second member 20 is preferably 4.0 mm or less, and more preferably 3.0 mm or less.

Of two end portions 10*a*, 10*b* in the axial direction A of the first member 10, the end portion 10*a* is an end portion on the vehicle-exterior side in the vehicle length direction of the automobile, and an end portion on an input side of a collision load at the time of frontal collision and at the time of rear collision. Meanwhile, the end portion 10*b* of the first member 10 is an end portion on the vehicle-interior side (passenger section side) in the vehicle length direction.

The second member 20 extends from the end portion 10*b* toward the end portion 10*a* in the axial direction A of the first member 10. An inside diameter of the second member 20 is larger than an outside diameter of the first member 10, and a part of an outer peripheral surface of the first member 10 is covered with the second member 20. In the examples illustrated in FIG. 3 and FIG. 4, a position of an end portion 20*b* of the second member 20 corresponds to that of the end portion 10*b* of the first member 10. On the other hand, the length of the second member 20 in the axial direction A is shorter than the length of the first member 10, and thus the other end portion 20*a* of the second member 20 is positioned at a middle portion of the first member 10 in the axial direction A.

Length in Axial Direction of Second Member

A length L' of the second member 20 in the axial direction A (FIG. 4) is 15 to 75% of a length L of the first member 10. As presented in later-described examples, as long as the length L' of the second member 20 is 15% or more of the length L of the first member 10, an effect of improvement in energy absorption efficiency is large.

In the viewpoint of enhancing this effect, the length L' of the second member 20 is more preferably 30% or more of the length L of the first member 10, and further preferably 40% or more thereof. On the other hand, when the length L' of the second member 20 exceeds 75% of the length L of the first member 10, the effect of improvement in energy absorption efficiency is saturated. This allows effective securing of the energy absorption efficiency while restraining an increase in weight of the impact absorbing structure 1 as long as the length L' of the second member 20 is 75% or less of the length L of the first member 10.

A thickness ratio (t/t') between a sheet thickness t of the first member 10 and a sheet thickness t' of the second member 20 is preferably 0.25 to 4.0. As presented in the later-described examples, the thickness ratio satisfies this range, thereby easily improving the energy absorption efficiency. In the viewpoint of enhancing this effect, the above-described thickness ratio is more preferably 0.75 or more, and further preferably 1.0 or more. Further, in a similar viewpoint, the above-described thickness ratio is more preferably 2.0 or less, and further preferably 1.5 or less.

Joint Line

The first member 10 and the second member 20 are joined to each other. A joining method is not particularly limited, but the two members 10, 20 are joined by using, for example, a welding means such as laser welding or an adhesive. The joining method is not limited as described above, but a "joint line 30" which is a boundary line between a joint region and a non joint region of the first member 10 and the second member 20 is required to extend along the axial direction A of the first member 10.

In an example illustrated in FIG. 3, the first member 10 and the second member 20 are joined by welding, and a weld bead extending along the axial direction A is the joint line 30 in this example. The joint line 30 extends along the axial direction A, thereby allowing a further improvement in energy absorption efficiency than the joint line 30 extending along, for example, a circumferential direction C of the first member 10. Further, from the viewpoint of improving the energy absorption efficiency, a plurality of the joint lines 30 are preferably present, and in examples illustrated in FIG. 3 to FIG. 5, the six joint lines 30 extending along the axial direction A are present at intervals in the circumferential direction C of the first member 10.

A length of the joint line 30 in the axial direction A is optionally set depending on the required energy absorption efficiency, and the joint line 30 preferably extends from one end portion 20*a* to the other end portion 20*b* of the second member 20 as in FIG. 3.

When the joint line 30 extends from one end portion 20*a* to the other end portion 20*b* of the second member 20, a surface, on a side opposite to the first member 10, of the second member 20 (an inner peripheral surface of the second member 20 in the example illustrated in FIG. 3) is divided into a plurality of regions with the joint lines 30 being boundaries. Further, an area of each of the divided regions is preferably 60% or less of the total area by totaling areas of the regions.

In the examples illustrated in FIG. 3 to FIG. 5, the joint lines 30 extending along the axial direction A are present at six positions at intervals along the circumferential direction C, and thus the inner peripheral surface of the second member 20 is divided into six regions. Thus, when respective areas of the six regions are set as $S_1$, $S_2$, $S_3$, $S_4$, $S_5$, $S_6$ ($S_4$ to $S_6$ are not illustrated), each of the areas $S_1$, $S_2$, $S_3$, $S_4$, $S_5$, $S_6$ is preferably 60% or less of the total area ($S_1+S_2+S_3+S_4+S_5+S_6$).

As presented in the later-described examples, as long as the area of each of the regions is 60% or less of the total area, the energy absorption efficiency can be effectively improved. In the viewpoint of enhancing this effect, the area of each of the regions is preferably 50% or less of the total area, and more preferably 40% or less thereof.

Figure 6:
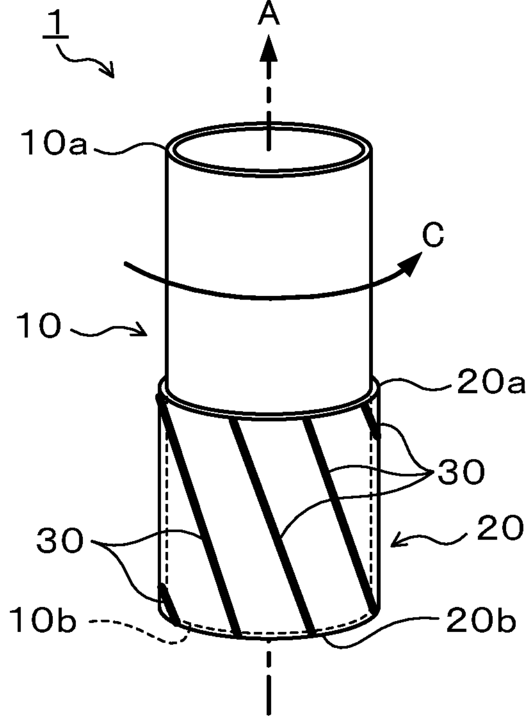
FIG. 6 is an explanatory view illustrating one example of a joint line.

Note that as illustrated in FIG. 6, the joint line 30 may be inclined to the axial direction A. Also in this case, as compared with a case where only the joint line 30 extending in the circumferential direction C is present, the energy absorption efficiency can be further improved. That is, it is recommendable for the joint line 30 to extend in a direction different from the circumferential direction C.

Figure 7:
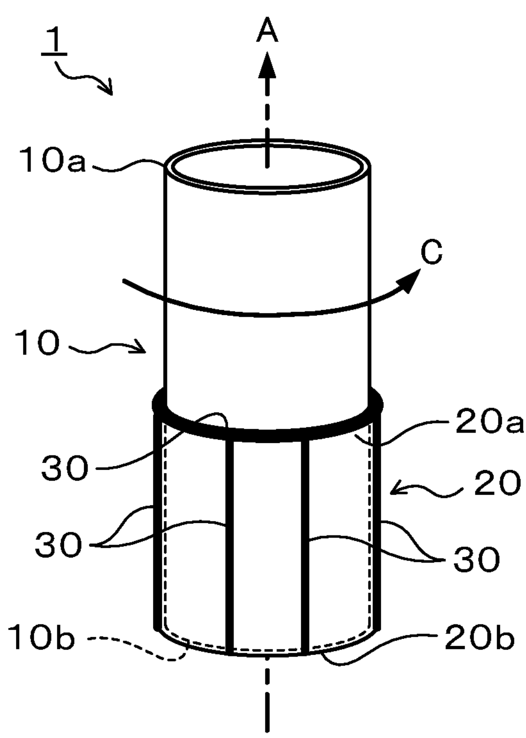
FIG. 7 is an explanatory view illustrating one example of the joint line.

Further, as illustrated in FIG. 7, the joint line 30 may be disposed to extend in each of the axial direction A and the circumferential direction C, or may be disposed to extend in each of the direction inclined to the axial direction A as in FIG. 6 (oblique direction) and the circumferential direction C. Moreover, the joint line 30 may be disposed to extend in each of the axial direction A, the oblique direction, and the circumferential direction C by a combination of a form in FIG. 6 and a form in FIG. 7.

Figure 8:
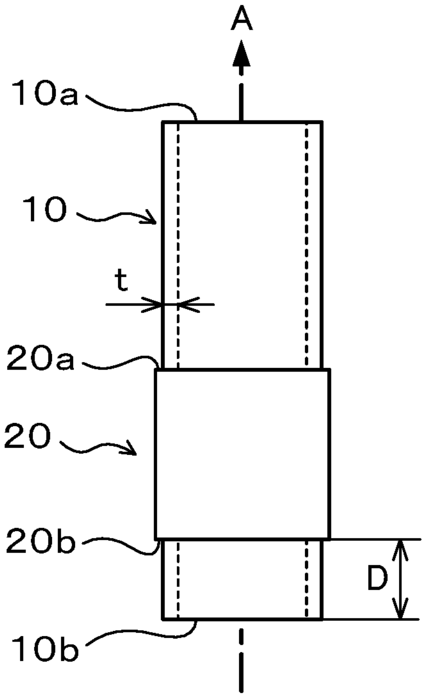
FIG. 8 is an explanatory view of a distance D between end portions of a first member and a second member.

In the above examples illustrated in FIG. 3 to FIG. 7, the positions of the end portion 10*b* of the first member 10 and the end portion 20*b* of the second member 20 correspond to each other, and the positions of the end portions 10*b*, 20*b* need not correspond to each other as illustrated in FIG. 8.

However, excessive separation of the end portion 20*b* of the second member 20 from the end portion 10*b* of the first member 10 has the possibility of the occurrence of buckling between the end portions 10*b*, 20*b* before axial crush deformation sufficiently progresses in a region between the end portion 10*a* of the first member 10 which is the end portion on the vehicle-exterior side in the vehicle length direction and the end portion 20*b* of the second member 20. After the occurrence of such buckling, the axial crush deformation of the impact absorbing structure 1 becomes difficult, which reduces the effect of improvement in energy absorption efficiency.

Distance D Between End Portions

For the above reason, when the positions of the end portion 10*b* of the first member 10 and the end portion 20*b* of the second member 20 do not correspond to each other as in FIG. 8, a distance D between the end portions 10*b*, 20*b* needs to be limited. As a "distance between end portions" of the first member 10 and the second member 20, two of a distance between the end portion 10*a* and the end portion 20*a* and a distance between the end portion 10*b* and the end portion 20*b* are considered, and the distance D in the present description means the distance between the end portions 10*b*, 20*b* on the vehicle-interior side (passenger section side) in the vehicle length direction.

Note that in regarding the impact absorbing structure 1 attached to a vehicle body as a single body, in a case where it is impossible to judge which of the end portion 10*a* and the end portion 10*b* of the first member 10 is positioned on the vehicle-interior side, the above-described distance D means a shorter distance of the distance between the end portions 10*a*, 20*a* and the distance between the end portions 10*b*, 20*b*.

In a case where the first member 10 is in the cylindrical shape as in this embodiment, the distance D is required to satisfy, when a maximum curvature radius of the first member 10 is set as R, and a sheet thickness of the first member 10 is set as t, $D<0.40Rt$. The distance D satisfies this range, thereby making it difficult that the buckling occurs in a region between the end portion 10*b* of the first member 10 and the end portion 20*b* of the second member 20.

This facilitates the axial crush deformation between the end portion 10*a* and the end portion 20*a* on the other side, which allows the improvement in energy absorption efficiency of the impact absorbing structure 1. In the viewpoint of enhancing this effect, $D<0.36Rt$ is preferably satisfied, and $D<0.32Rt$ is more preferably satisfied.

Note that as long as the first member 10 is a perfectly circular cylinder, a radius of a circle thereof is a maximum curvature radius R, and, for example, in such a case where the first member 10 has curvature radii varying in a circumferential direction as an elliptical cylinder, the maximum curvature radius R is defined in the following manner.

Figure 9:
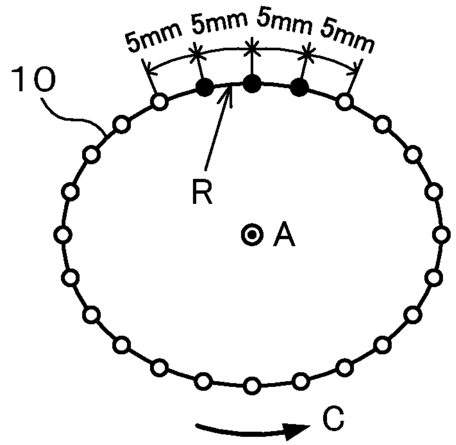
FIG. 9 is an explanatory view of a maximum curvature radius R of the first member.

First, as illustrated in FIG. 9, in a cross section perpendicular to the axial direction A of the first member 10, measurement points of the curvature radii are set at intervals of 5 mm along the circumferential direction C of the first member 10. Then, the curvature radii each made of three successive dots in the circumferential direction C are measured to set the largest curvature radius as the maximum curvature radius R. In an example illustrated in FIG. 9, a curvature radius of a curve formed of black dots has the largest value of the curvature radii each made of three successive dots in the circumferential direction C, and thus the curvature radius made of the three black dots is the maximum curvature radius R.

The impact absorbing structure 1 according to this embodiment is constituted as described above. In the impact absorbing structure 1, the second member 20 is joined to an outer surface of the first member 10, the joint line 30 extends along the axial direction A, and the distance D between the end portions 10*b*, 20*b* of the first member 10 and the second member 20 satisfies $D<0.40Rt$.

According to the impact absorbing structure 1 constituted in this manner, a region in the vicinity of the end portion 10*b* on the vehicle-interior side is stiffened by the second member 20, which allows restraint on the occurrence of buckling in this region when the collision load is input. This causes the axial crush deformation of the impact absorbing structure 1 to easily appear, which allows the improvement in energy absorption efficiency of the impact absorbing structure 1.

Figure 10:
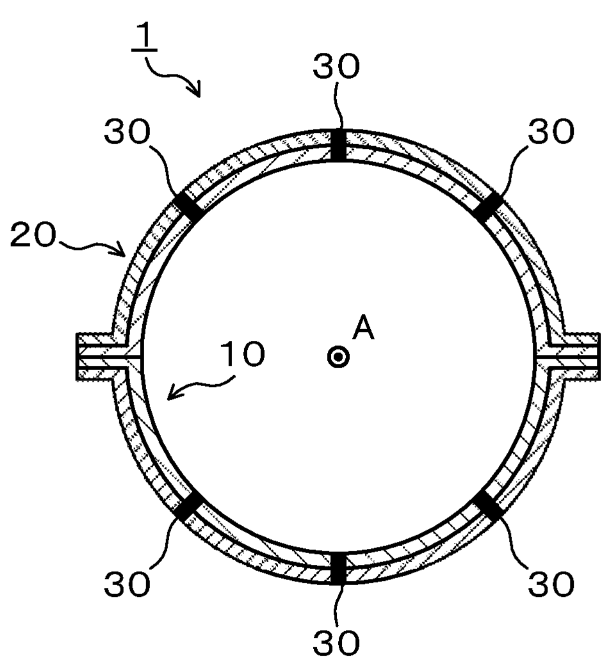
FIG. 10 is a view illustrating a structure example of the impact absorbing structure.

Note that the "member in the cylindrical shape" in the present description also includes, for example, a member whose shape in the cross section perpendicular to the axial direction A is an elliptical shape. Further, the member in the cylindrical shape is not limited to being constituted by a single member, but may be constituted by combining a plurality of members. For example, the member in the cylindrical shape may be a member constituted by joining semi-cylindrical members each having a flange to each other as illustrated in FIG. 10.

In the impact absorbing structure 1 described above, the first member 10 and the second member 20 are both in the cylindrical shape, and the second member 20 may be an arc-shaped plate member in a shape in the cross section perpendicular to the axial direction A, to form a cylindrical shape by joining a plurality of the second members 20 to one another. Further, the impact absorbing structure 1 may be constituted as follows, for example.

Other Configuration Example 1

Figure 11:
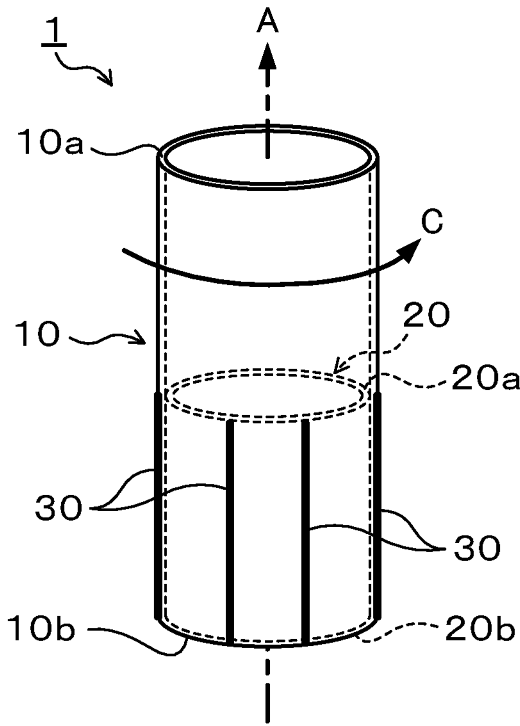
FIG. 11 is an explanatory view illustrating an example of joining the second member to an inner surface of the first member.
Figure 12:
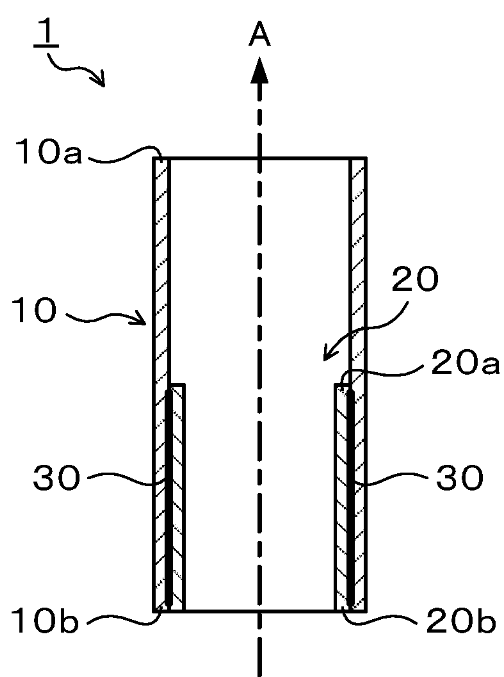
FIG. 12 is a sectional view of the impact absorbing structure in FIG. 11 taken along the axial direction.

A configuration example illustrated in FIG. 11 and FIG. 12 is an example in which the first member 10 and the second member 20 are each in the cylindrical shape similarly to the configuration example illustrated in FIG. 3, and the second member 20 is joined to not the outer peripheral surface but an inner peripheral surface of the first member 10. Note that in this configuration example, the distance D between the end portions 10*b*, 20*b* of the first member 10 and the second member 20 is "0".

Other Configuration Example 2

Figure 13:
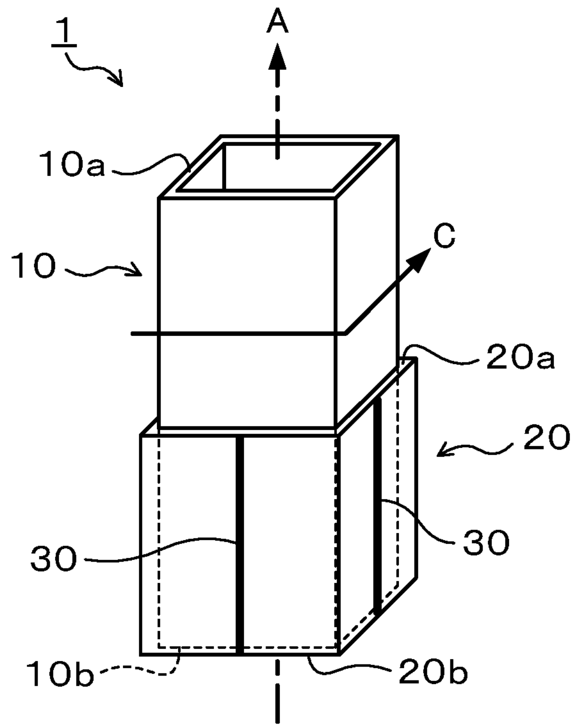
FIG. 13 is an explanatory view illustrating an example in which the first member is in a square tube shape.
Figure 14:
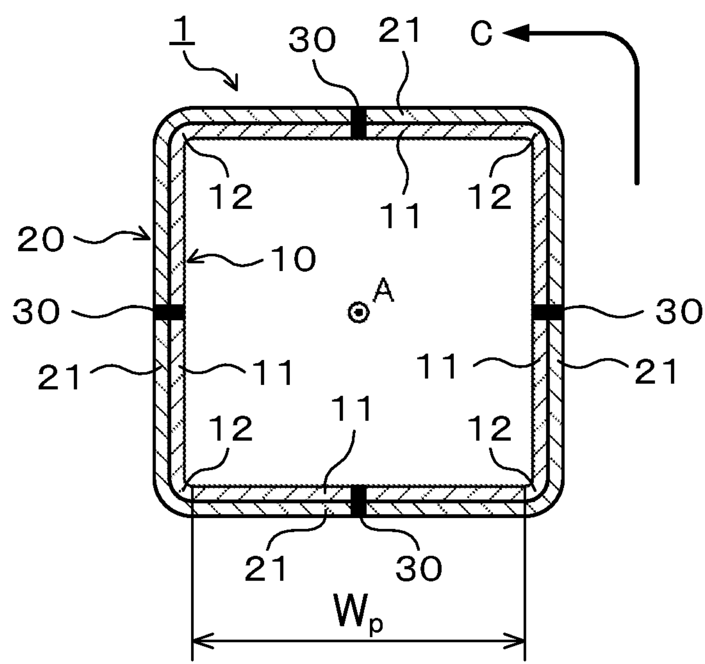
FIG. 14 is a sectional view of the impact absorbing structure in FIG. 13 taken perpendicularly to the axial direction.

A configuration example illustrated in FIG. 13 and FIG. 14 is an example in which the first member 10 and the second member 20 are each in a square tube shape differently from the configuration example illustrated in FIG. 3. In this impact absorbing structure 1, a flat surface portion 21 of the second member 20 is joined to an outer surface of a flat surface portion 11 of the first member 10.

In a case where the first member 10 is in the square tube shape, the distance D illustrated in FIG. 8 is required to satisfy, when a width of the flat surface portion 11 of the first member 10 is set as $W_p$, and a sheet thickness thereof is set as t, $D<1.11W_pt$. In this configuration example, the distance D between the end portions 10*b*, 20*b* of the first member 10 and the second member 20 is "0", and satisfies the numerical range of the above-described distance D. Note that the above-described distance D preferably satisfies $D\leq 0.90W_pt$, more preferably satisfies $D\leq 0.75W_pt$, and further preferably satisfies $D\leq 0.56W_pt$.

Note that the "flat surface portion" in the present description is a portion excluding a curved surface connecting two adjacent flat surfaces (hereinafter sometimes described as a "ridge line portion 12") in the cross section perpendicular to the axial direction A. The "width of the flat surface portion" is a length from the R-end of one curved surface adjacent to the flat surface portion to the R-end of the other curved surface. Further, the above-described relation of $D<1.11W_pt$ is preferably satisfied by all the flat surface portions 11 of the first member 10.

Other Configuration Example 3

Figure 15:
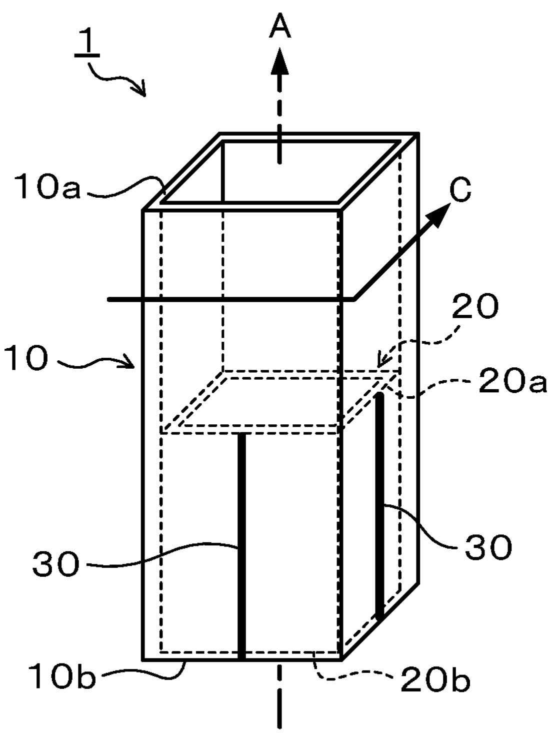
FIG. 15 is an explanatory view illustrating an example of joining the second member to an inner surface of the first member.

A configuration example illustrated in FIG. 15 is an example in which the first member 10 and the second member 20 are each in the square tube shape similarly to the configuration example illustrated in FIG. 13, and the second member 20 is joined to not the outer surface but an inner surface of the first member 10. Note that in this configuration example, the distance D between the end portions 10*b*, 20*b* of the first member 10 and the second member 20 is "0".

Also in the impact absorbing structures 1 in the other configuration examples 1 to 3 as described above, the second member 20 is joined to the outer surface or the inner surface of the first member 10, and the joint line 30 extends along the axial direction A. Further, the distance D between the end portion 10*b* of the first member 10 and the end portion 20*b* of the second member 20 satisfies D<0.40Rt or $D<1.11W_pt$. This allows the restraint on the occurrence of buckling in the vicinity of the end portion 10*b* of the first member 10 on the vehicle-interior side as previously described.

Figure 16:
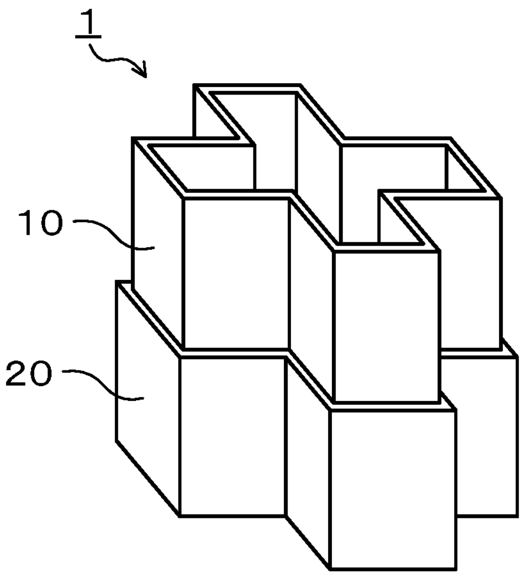
FIG. 16 is a view illustrating a structure example of the impact absorbing structure.

Note that the "member in the square tube shape" in the present description is not limited to having a quadrangle such as a square or a rectangle, but, for example, may have a polygonal shape such as a hexagon in a shape in the cross section perpendicular to the axial direction A, or may be a cross-shaped member in the shape in the cross section perpendicular to the axial direction A as illustrated in FIG. 16.

Figure 17:
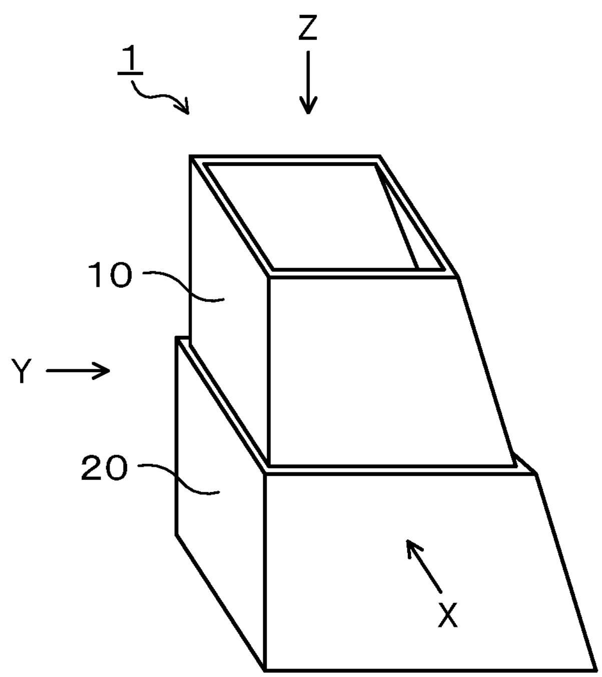
FIG. 17 is a view illustrating a structure example of the impact absorbing structure.

Further, for example, the member in the square tube shape may be a trapezoidal member in a shape seen from the side of the impact absorbing structure 1 as illustrated in FIG. 17. Here, FIG. 18(*a*) illustrates the impact absorbing structure 1 seen from an X direction in FIG. 17, FIG. 18(*b*) illustrates the impact absorbing structure 1 seen from a Y direction in FIG. 17, and FIG. 18(*c*) illustrates the impact absorbing structure 1 seen from a Z direction in FIG. 17. Further, FIG. 18(*d*) is a view of the impact absorbing structure 1 taken so as to be along the axial direction A and include slopes of the first member 10 and the second member 20.

Figure 18:
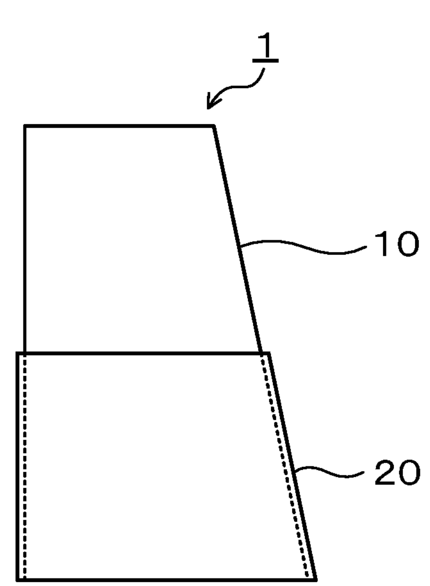
FIG. 18 are views of the impact absorbing structure in FIG. 17 seen from respective directions of X to Z directions, and a view thereof taken along the axial direction.
Figure 18:
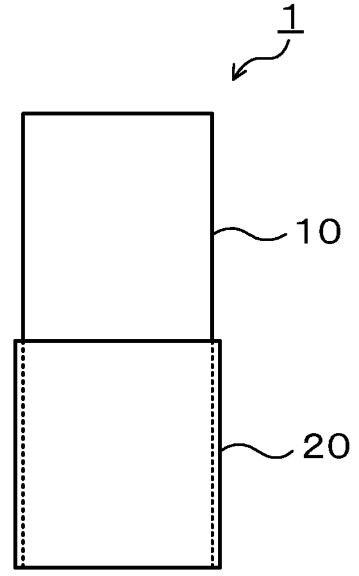
Figure 18:
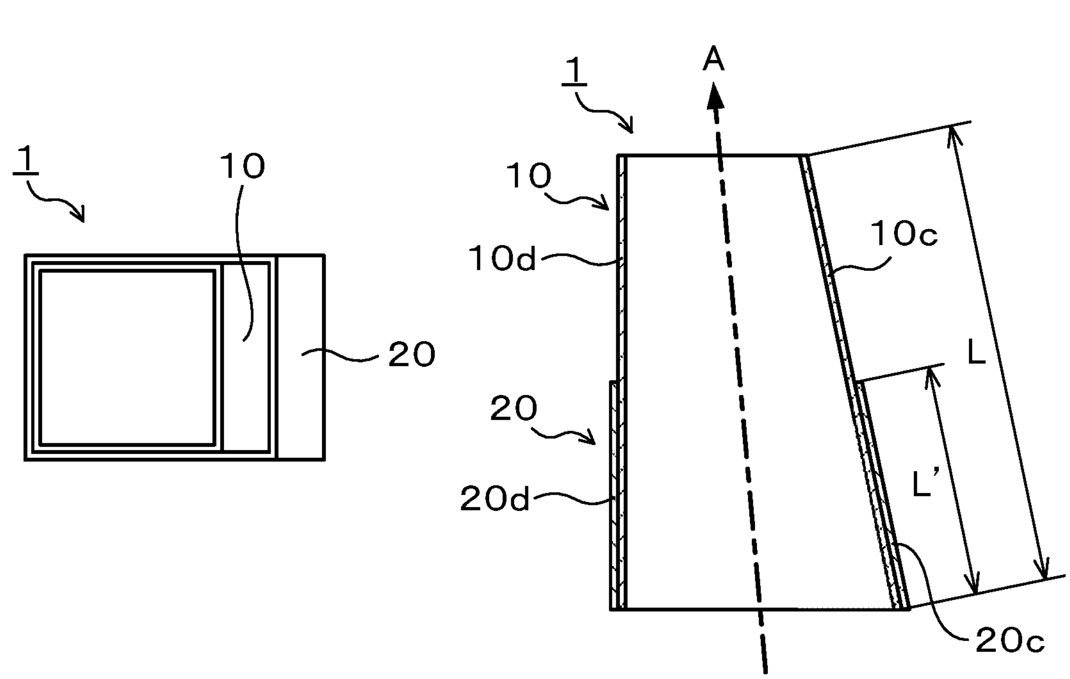

Note that as illustrated in FIG. 18(*d*), in this example, an extending direction of a flat surface portion 20*d* opposite to a sloped portion 20*c* of the second member 20 does not closely correspond to the axial direction A of the first member 10. However, the flat surface portion 20*d* of the second member 20 extends in substantially the same direction as the axial direction A of the first member 10 along a flat surface portion 10*d* opposite to a sloped portion 10*c* of the first member 10, and thus in the present description, such a case is also defined as "the second member 20 extends in the axial direction A of the first member 10".

Further, in the structure illustrated in FIG. 18(*d*), in examining the previously-described ratio between the lengths in the axial direction of the first member 10 and the second member 20, a length of the sloped portion 10*c* of the first member 10 (a distance between end points of the sloped portion 10*c*) and a length of the sloped portion 20*c* of the second member 20 (a distance between end points of the sloped portion 20*c*) are compared. Further, as long as a length L' of the sloped portion 20*c* of the second member 20 is 15 to 75% of a length L of the sloped portion 10*c* of the first member 10, the impact absorbing structure 1 as illustrated in FIG. 18(*d*) satisfies a necessary condition of the length in the axial direction according to this embodiment.

Figure 19:
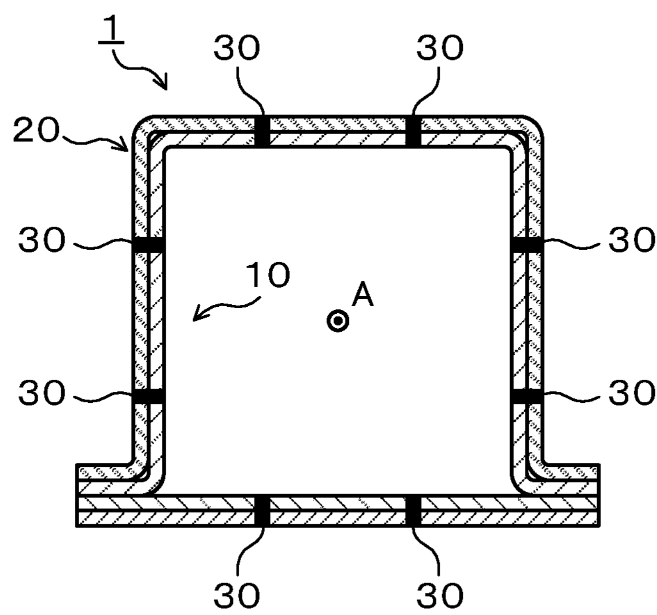
FIG. 19 is a view illustrating a structure example of the impact absorbing structure.

Further, the member in the square tube shape is not limited to being constituted by a single member, but may be constituted by combining a plurality of members. For example, the member in the square tube shape may be a member constituted by joining a hat-shaped member and a closing plate as illustrated in FIG. 19.

Further, in the above description, regarding the impact absorbing structure 1, the plurality of configuration examples are presented, and in any of the configuration examples, the thickness ratio t/t' between the first member 10 and the second member 20, the area S of each of the regions divided by the joint lines 30 (FIG. 3), and the like preferably satisfy the previously-described numerical ranges.

Second Embodiment

In this embodiment, a shape of a second member 20 is different from that in the first embodiment. Hereinafter, an impact absorbing structure 1 according to this embodiment will be described while referring to the drawings.

Figure 20:
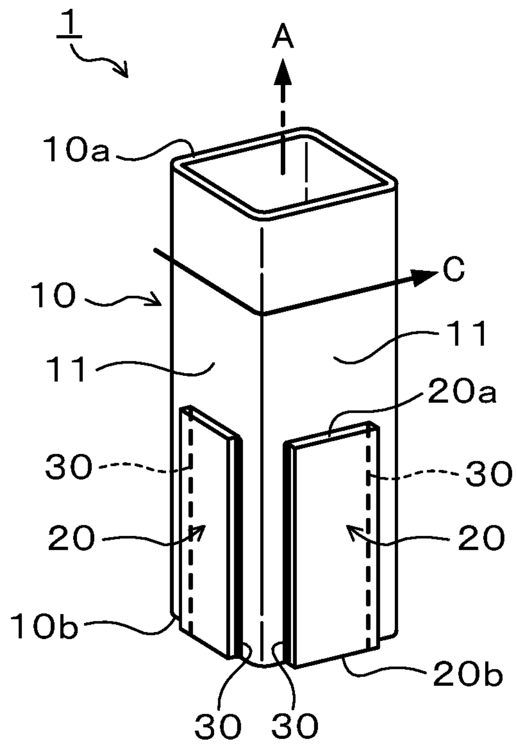
FIG. 20 is an explanatory view illustrating a schematic configuration of an impact absorbing structure according to a second embodiment.
Figure 21:
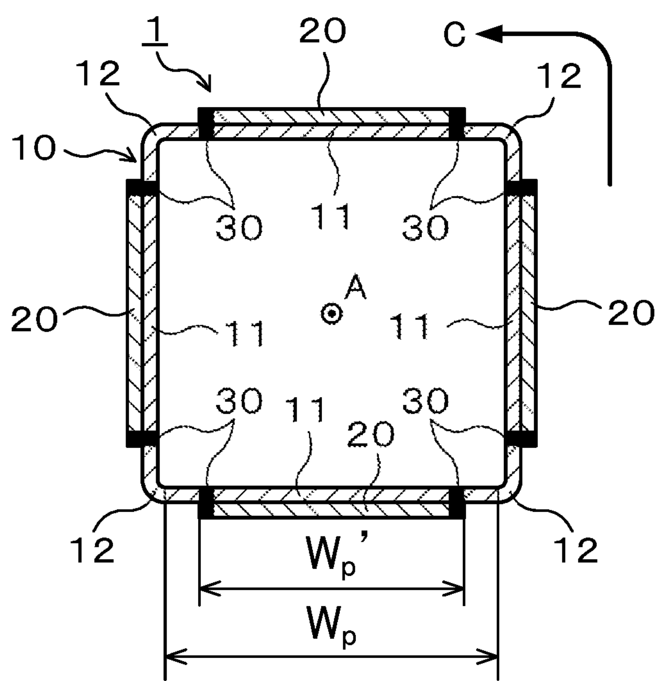
FIG. 21 is a sectional view of the impact absorbing structure in FIG. 20 taken perpendicularly to an axial direction.

FIG. 20 is an explanatory view illustrating a schematic configuration of the impact absorbing structure 1 according to this embodiment. FIG. 21 is a sectional view of the impact absorbing structure 1 taken perpendicularly to an axial direction A, and illustrates a cross section of a portion on which a first member 10 and second members 20 are overlapped.

In the impact absorbing structure 1 illustrated in FIG. 20 and FIG. 21, the first member 10 is formed in a square tube shape, and the second member 20 is formed in a plate shape.

A plurality of the second members 20 are provided, and the second members 20 are each joined to a flat surface portion 11 of the first member 10. A joint line 30 extends along the axial direction A of the first member 10. Note that also when the second member 20 is formed in the plate shape as in this embodiment, a joining method of the first member 10 and the second member 20 is not particularly limited, but the two members 10, 20 are joined by using, for example, a welding means such as fillet welding by arc welding or laser welding, or an adhesive.

Further, a distance D between an end portion 10*b* of the first member 10 and an end portion 20*b* of the second member 20 is "0" to satisfy the previously-described relation of $D<1.11W_pt$.

Accordingly, also in the impact absorbing structure 1 according to this embodiment, similarly to the first embodiment, a stiffening effect produced by the second member 20 allows restraint on buckling in the vicinity of the end portion 10*b* of the first member 10. This causes axial crush deformation to easily appear in the impact absorbing structure 1, which allows an improvement in energy absorption efficiency.

When the second member 20 is joined to the flat surface portion 11 of the first member 10, a width $W_p'$ of a region in which the second member 20 is joined in the flat surface portion 11 is preferably 25% or more of a width $W_p$ of the flat surface portion 11. As presented in later-described examples, the width $W_p'$ satisfies the range, thereby allowing the easy appearance of the axial crush deformation in the vicinity of the end portion 10*a* of the first member 10, which enables securing of a larger plastic deformation region of the first member 10. In the viewpoint of enhancing this effect, the above-described width $W_p'$ is preferably 30% or more of the width $W_p$ of the flat surface portion 11, and further preferably 40% or more thereof.

Note that the "region in which the second member 20 is joined" in the present description is a region between the two most distant joint lines 30 of a plurality of the joint lines 30 present in the one second member 20. For example, when the three joint lines 30 are present in the one second member 20, a region between the two remaining joint lines 30 excluding the joint line 30 positioned in the middle thereof is the region in which the second member 20 is joined.

In an example illustrated in FIG. 21, the two joint lines 30 are present in the one second member 20, and these joint lines 30 are positioned at both ends of the second member 20, and thus a width of the region in which the second member 20 is joined is equal to a width of the second member 20. On the other hand, for example, when the two joint lines 30 are not positioned at either of the ends of the second member 20, the width of the region in which the second member 20 is joined is narrower than the width of the second member 20.

Further, in examples illustrated in FIG. 20 and FIG. 21, the respective second members 20 are joined to all the flat surface portions 11 of the first member 10, or need not be joined to all the flat surface portions 11. For example, the second members 20 may be joined only to the two opposite flat surface portions 11, or may be joined only to the two adjacent flat surface portions 11. Further, for example, the second member 20 may be joined only to any one of a plurality of the flat surface portions 11. Also in these cases, the effect of restraining the occurrence of buckling in the vicinity of the end portion 10*b* of the first member 10 is obtained by stiffening of the second member 20.

Other Configuration Example

Figure 22:
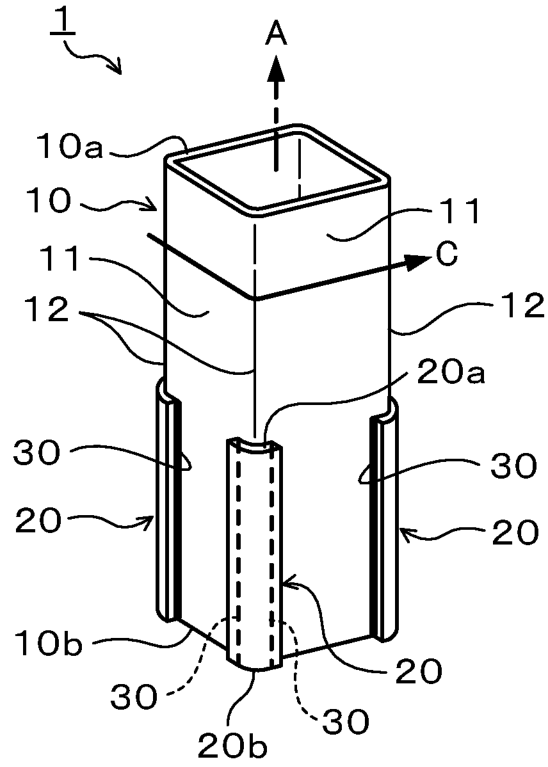
FIG. 22 is an explanatory view illustrating an example of joining second members to ridge line portions of a first member.
Figure 23:
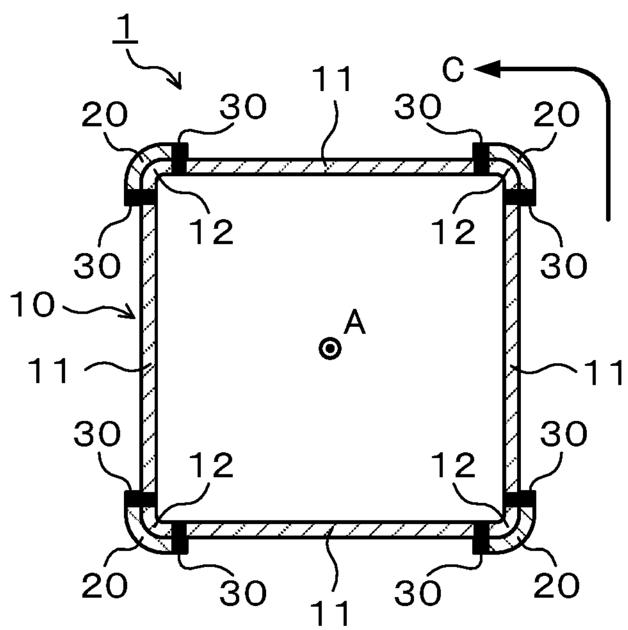
FIG. 23 is a sectional view of the impact absorbing structure in FIG. 22 taken perpendicularly to the axial direction.

In the above example, the second member 20 is joined to the flat surface portion 11 of the first member 10, and the second member 20 may be joined to a ridge line portion 12 of the first member 10 as illustrated in FIG. 22 and FIG. 23, for example.

In this configuration example, the plurality of second members 20 are joined to the respective ridge line portions 12 of the first member 10, and the joint line 30 extends along the axial direction A. Further, the distance D between the end portion 10*b* of the first member 10 and the end portion 20*b* of the second member 20 is "0" to satisfy the previously-described relation of $D<1.11W_pt$.

Thus, also in the impact absorbing structure 1 illustrated in FIG. 22, the stiffening effect of the second member 20 allows restraint on the occurrence of buckling in the vicinity of the end portion 10*b* of the first member 10.

Figure 24:
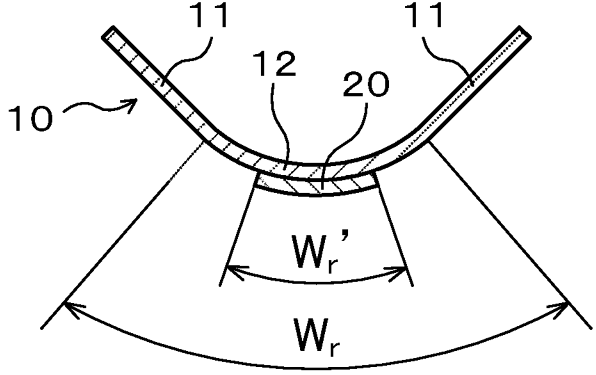
FIG. 24 is an enlarged view of the ridge line portion of the first member in which the second member is joined.

As illustrated in FIG. 24, a length $W_r'$ in a circumferential direction C of a region in which the second member 20 is joined is preferably 15% or more of a length $W_r$ of the ridge line portion 12 of the first member 10. As presented in the later-described examples, the length $W_r'$ in the circumferential direction is 10% or more of the length $W_r$ in the circumferential direction of the ridge line portion 12, thereby causing the axial crush deformation to easily appear in the vicinity of the end portion 10*a* of the first member 10, which enables securing of a larger plastic deformation region of the first member 10. This allows an increase in energy absorption efficiency. In the viewpoint of enhancing this effect, the above-described length $W_r'$ in the circumferential direction is more preferably 20% or more of the length $W_r$ in the circumferential direction of the ridge line portion 12.

Further, in examples illustrated in FIG. 22 and FIG. 23, the respective second members 20 are joined to all the ridge line portions 12 of the first member 10, or need not be joined to all the ridge line portions 12. For example, the second members 20 may be joined only to the two diagonally positioned ridge line portions 12, or may be joined only to the two ridge line portions 12 between which the one flat surface portion 11 is sandwiched. Further, for example, the second member 20 may be joined only to any one of a plurality of the ridge line portions 12. Also in these cases, the effect of restraining the occurrence of buckling in the vicinity of the end portion 10*b* of the first member 10 is obtained by stiffening of the second member 20.

Note that in the second embodiment, the example of joining the second member 20 to the flat surface portion 11 and the example of joining the second member 20 to the ridge line portion 12 are presented, and the second member 20 may be joined to each of the flat surface portion 11 and the ridge line portion 12. Further, in the second embodiment, the example of joining the second member 20 to an outer surface of the first member 10 is presented, and the second member 20 may be joined to an inner surface of the first member 10.

Further, also in the second embodiment, similarly to the first embodiment, a length L' of the second member 20 in the axial direction A (FIG. 4) and a thickness ratio t/t' between the first member 10 and the second member 20 preferably satisfy the previously-described numerical ranges.

Figure 25:
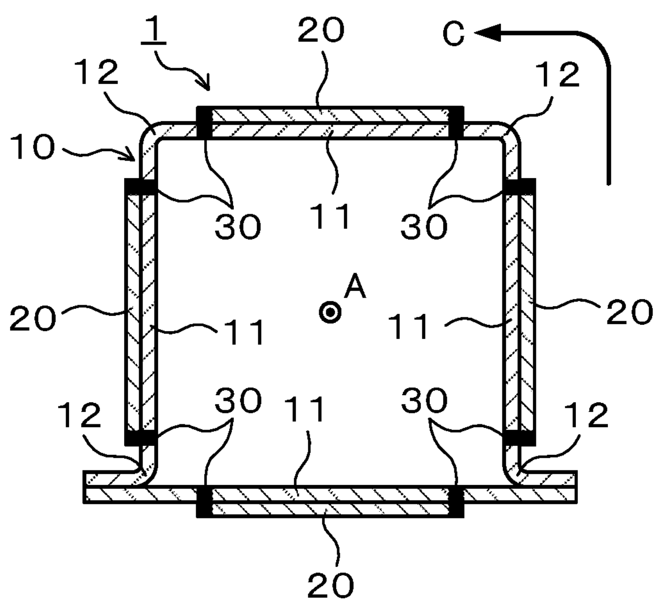
FIG. 25 is a view illustrating a shape example of the first member.

Further, as previously described, in the first member 10, a shape in a cross section perpendicular to the axial direction A is not limited to a quadrangle such as a square or a rectangle. The first member 10 may be, for example, a member in a polygonal shape such as a hexagon, members in the shapes illustrated in FIG. 16 and FIG. 17, or a member constituted by a hat-shaped member and a closing plate. FIG. 25 illustrates a joining example of the second members 20 when the first member 10 is constituted by the hat-shaped member and the closing plate.

Application Example of Impact Absorbing Structure

Here, examples in which the impact absorbing structures 1 as described in the above first to second embodiments are applied as the crash box or the side member will be described in more detail.

Figure 26:
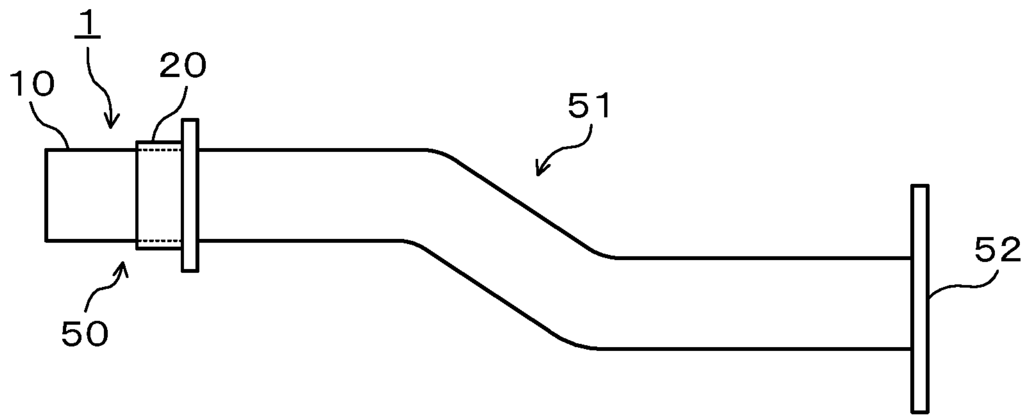
FIG. 26 are explanatory views for explaining application examples of the impact absorbing structure.
Figure 26:
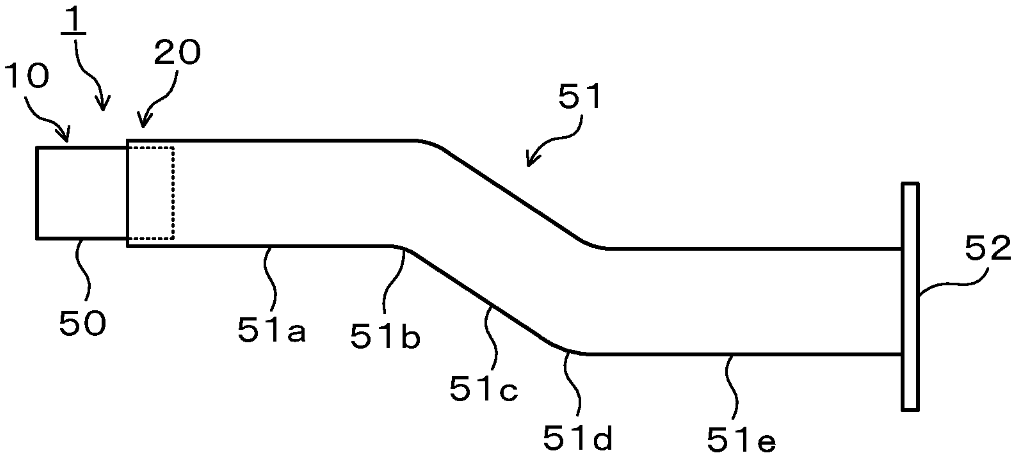

First, FIG. 26(*a*) illustrates the example in which the impact absorbing structure 1 is applied as a crash box 50. The crash box 50 is attached to an end portion of a side member 51, and the other end portion of the side member 51 is joined to an inner panel 52 (for example, dash panel) on the passenger section side. In this example, the impact absorbing structure 1 is constituted by the single crash box 50, which allows replacement with another new crash box 50 when the crash box 50 is crushed by collision.

Next, FIG. 26(*b*) illustrates the example in which the impact absorbing structure 1 is constituted by the crash box 50 and the side member 51. In this example, the first member 10 of the impact absorbing structure 1 is the crash box 50, and the second member 20 thereof is a straight portion 51*a* of the side member 51.

The side member 51 illustrated in FIG. 26(*b*) is in a shape having the straight portion 51*a*, a bent portion 51*b*, an inclined portion 51*c*, a bent portion 51*d*, and a straight portion 51*e* in order from the crash box 50 side toward the inner panel 52 side. Note that the "straight portion" in the present description is a portion extending in substantially the same direction as an axial direction of the crash box 50. For example, the inclined portion 51*c* of the side member 51 is also linearly formed similarly to the straight portions 51*a*, 51*e*, but the inclined portion 51*c* extends in a clearly different direction from the axial direction of the crash box 50, and thus does not correspond to the straight portion in the present description.

Normally, the side member 51 has an impact absorbing portion which absorbs collision energy through its own deformation, and a load bearing portion which restrains deformation with respect to a collision load for protection of passenger space. In the example illustrated in FIG. 26(*b*), the above-described impact absorbing portion is the straight portion 51*a* on the crash box 50 side, and the above-described load bearing portion is the straight portion 51*e* on the inner panel 52 side.

Figure 27:
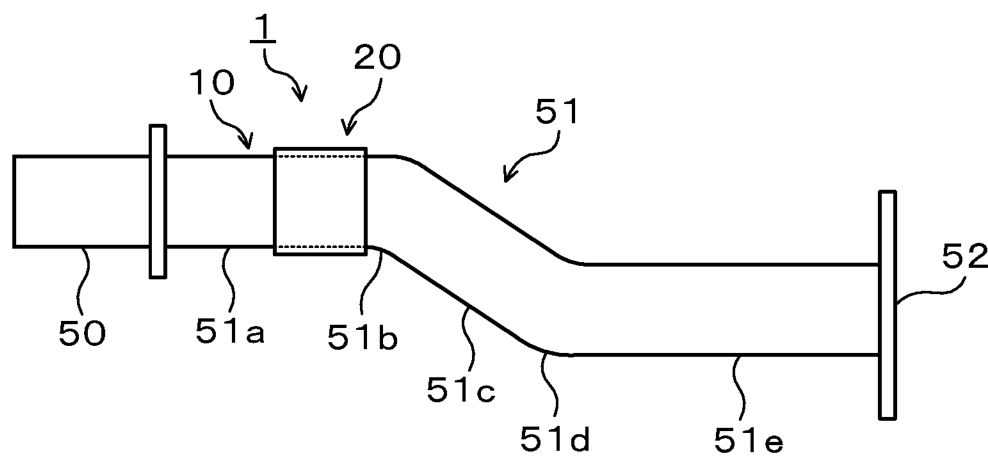
FIG. 27 are explanatory views for explaining application examples of the impact absorbing structure.
Figure 27:
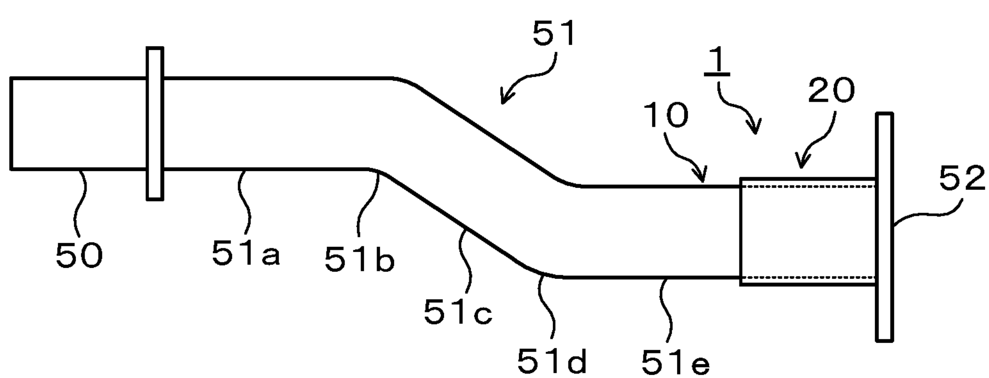

Next, FIG. 27(*a*) illustrates the example in which the impact absorbing structure 1 is applied to the straight portion 51*a* (impact absorbing portion) of the side member 51. In this example, the first member 10 is the straight portion 51*a*, and the second member 20 is a reinforcing material provided in the vicinity of an end portion on the bent portion 51*b* side in the straight portion 51*a*.

In this example, both of the two end portions in the axial direction of the second member 20 are positioned in the straight portion 51*a*. In other words, the end portion of on the bent portion 51*b* side in the second member 20 does not overlap this bent portion 51*b*. Thus, the second member 20 is not positioned at the bent portion 51*b*, thereby resulting in that an appearance section of the previously-described restraint effect of buckling at the time of collision is the straight portion 51*a*. This causes the restraint on the occurrence of buckling in the vicinity of a boundary between this straight portion 51*a* and the bent portion 51*b* at the time of collision.

In other words, for example, in a case where the second member 20 is in a shape extending from the straight portion 51*a* to the inclined portion 51*c* of the side member 51, the appearance section of the restraint effect of buckling moves to the inclined portion 51*c*. This causes easy occurrence of buckling in the vicinity of the boundary between the straight portion 51*a* and the bent portion 51*b* at the time of collision as compared with the impact absorbing structure 1 illustrated in FIG. 27(*a*).

Next, FIG. 27(*b*) illustrates the example in which the impact absorbing structure 1 is applied to the straight portion 51*e* (load bearing portion) of the side member 51. In this example, the first member 10 is the straight portion 51*e*, and the second member 20 is a reinforcing material provided in the vicinity of an end portion on the inner panel 52 side in the straight portion 51*e*.

Note that the above-described crash box 50 and side member 51 may be on a front side of the vehicle body or on a rear side thereof. Further, the side member 51 is not provided with the bent portion or the inclined portion in some cases, and even in the cases, by providing the second member 20 in the vicinity of the passenger section-side end portion of the straight portion, the impact absorbing structure 1 can be constituted.

Figure 28:
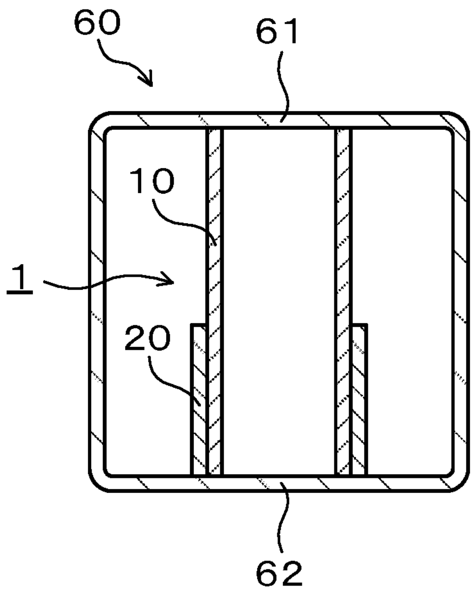
FIG. 28 is an explanatory view for explaining an application example of the impact absorbing structure.

FIG. 28 is a view illustrating the application example of the impact absorbing structure 1, and illustrates a cross section, of a crushing member 60 in a hollow shape, perpendicular to an axial direction thereof. The "crushing member" is a member whose wall surface is subjected to the collision load at the time of vehicle collision, and, for example, a member such as a bumper (front bumper or rear bumper) or a side sill corresponds to the crushing member.

In the example illustrated in FIG. 28, the impact absorbing structure 1 is disposed inside the crushing member 60. One end portion of the first member 10 of the impact absorbing structure 1 is joined to an inner surface of a vehicle-exterior wall portion 61 of the crushing member 60, and the other end portion of the first member 10 (an end portion on a side on which the second member 20 is joined) is joined to an inner surface of a vehicle-interior wall portion 62 of the crushing member 60. Note that the vehicle-exterior wall portion 61 when the crushing member 60 is the bumper is a wall portion positioned on the vehicle-exterior side in the vehicle length direction, and the vehicle-exterior wall portion 61 when the crushing member 60 is the side sill is a wall portion positioned on the vehicle-exterior side in a vehicle width direction.

According to the application example of the impact absorbing structure 1 illustrated in FIG. 28, when the collision load is input to the vehicle-exterior wall portion 61 of the crushing member 60, the restraint on buckling of the impact absorbing structure 1 in the vicinity of the vehicle-interior wall portion 62 allows an increase in impact absorption performance of the crushing member 60.

Although embodiments of the present invention have been described above, the present invention is not limited to such examples. It should be understood that various changes or modifications are readily apparent to those skilled in the art within the scope of the technical spirit as set forth in claims, and those should also be covered by the technical scope of the present invention as a matter of course.

Examples

[Simulation (1)]

Figure 29:
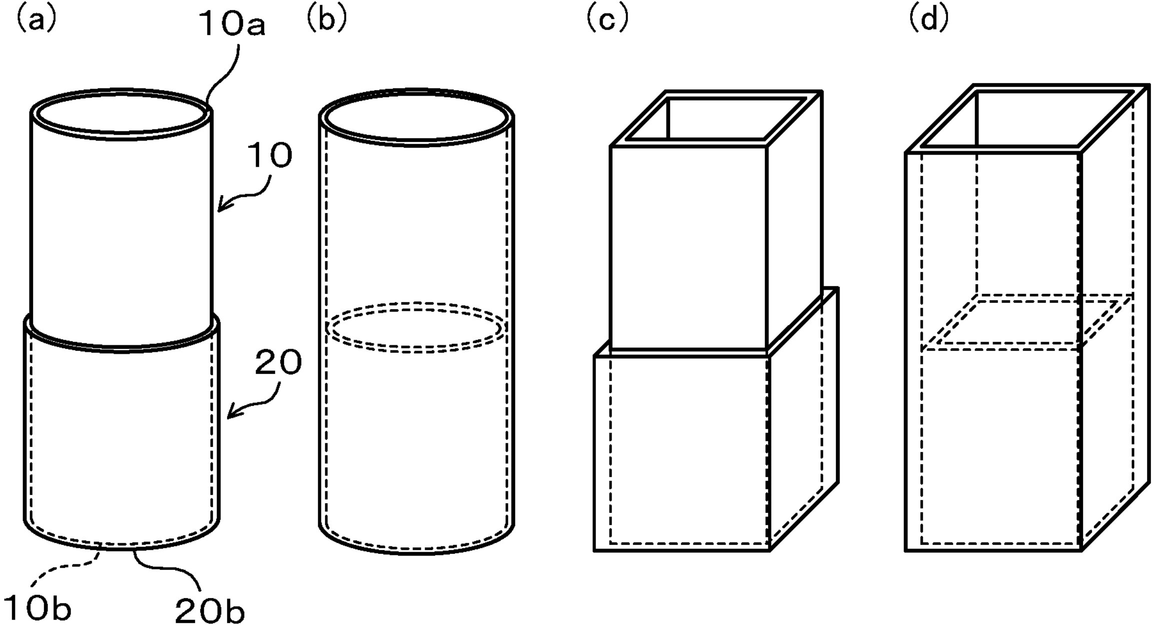
FIG. 29 are explanatory views illustrating analysis models in a simulation (1).

A crash simulation was carried out with the following analysis models illustrated in FIG. 29.

(a) the first member 10: a cylinder, the second member 20: a cylinder, a joint form: joining over the entire surface of an outer surface of the first member 10 and an inner surface of the second member 20

(b) the first member 10: a cylinder, the second member 20: a cylinder, a joint form: joining over the entire surface of an inner surface of the first member 10 and an outer surface of the second member 20

(c) the first member 10: a square tube, the second member 20: a square tube, a joint form: joining over the entire surface of an outer surface of the first member 10 and an inner surface of the second member 20

(d) the first member 10: a square tube, the second member 20: a square tube, a joint form: joining over the entire surface of an inner surface of the first member 10 and an outer surface of the second member 20

The first member 10 is presumed to be a 980 MPa-grade steel sheet having an outside diameter of 100 mm (for the square tube, 100 mm square), a length in an axial direction of 300 mm, and a sheet thickness of 1 mm, and the second member 20 is presumed to be a 980 MPa-grade steel sheet having an outside diameter of 102 mm (for the square tube, 102 mm square), a length in the axial direction of 150 mm, and a sheet thickness of 1 mm. The distance D between the end portions 10*b*, 20*b* of the first member 10 and the second member 20 described in FIG. 8 is "0".

The simulation was carried out by completely constraining the end portion 10*b* of the first member 10 and the end portion 20*b* of the second member 20 and applying a stroke at 1000 mm/s to the end portion 10*a* of the first member 10 along the axial direction. A solver used in the simulation is general-purpose finite element analysis software LS-DYNA (R7.1.3).

Figure 30:
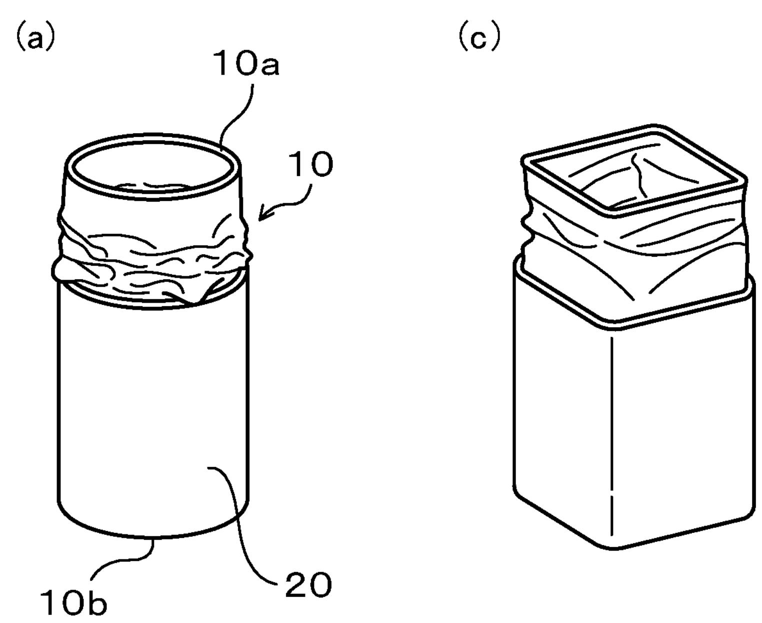
FIG. 30 are views illustrating deformed states of the analysis models in the simulation (1).

FIG. 30 are views illustrating deformed states of the model in FIG. 29(*a*) and the model in FIG. 29(*c*) in the above-described simulation. In either of the models, a region not stiffened with the second member 20 was subjected to axial crush deformation. Thereafter, in either of the models, a region stiffened with the second member 20 was subjected to the axial crush deformation. Note that the models in FIG. 29(*b*) and FIG. 29(*d*) also exhibited similar deformation behavior though not illustrated.

Figure 31:
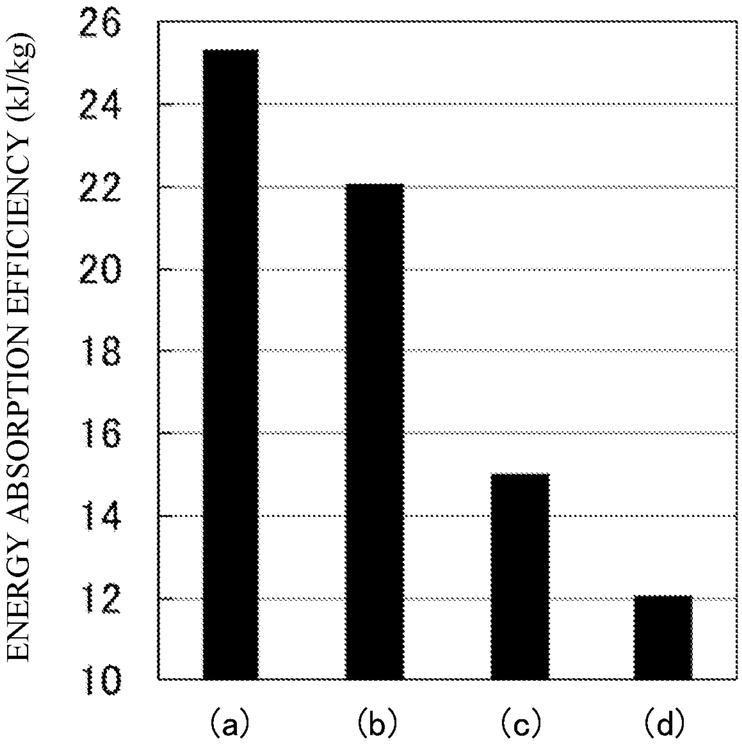
FIG. 31 is a chart illustrating energy absorption efficiencies of the analysis models in the simulation (1).

FIG. 31 is a graph illustrating energy absorption efficiencies (EA efficiencies) in applying a stroke of 100 mm to the end portions 10*a* of the first members 10. As illustrated in FIG. 31, in this simulation, the model in FIG. 29(*a*) resulted in having the highest energy absorption efficiency.

[Simulation (2)]

A simulation was carried out with models having different lengths in the axial direction of the second member 20 from that of the model in FIG. 29(*a*). Simulation conditions except for the lengths in the axial direction of the second member 20 are the same as those in the simulation (1).

Figure 32:
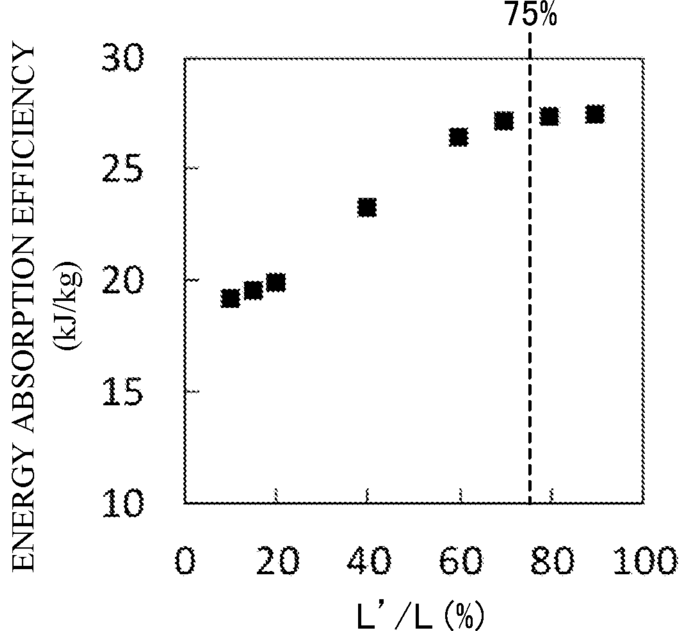
FIG. 32 is a chart illustrating energy absorption efficiencies of analysis models in a simulation (2).

FIG. 32 is a graph illustrating energy absorption efficiencies (EA efficiencies) in applying a stroke of 100 mm to the end portion 10*a* of the first member 10. A horizontal axis in FIG. 32 indicates a percentage of the length L' in the axial direction of the second member 20 with respect to the length L in the axial direction of the first member 10. As illustrated in FIG. 32, as long as the length L' in the axial direction of the second member 20 is 15% or more of the length L in the axial direction of the first member 10, an effect of improvement in energy absorption efficiency is easily obtained, and exceeding 75% saturates the effect of improvement in energy absorption efficiency.

[Simulation (3)]

A simulation was carried out with models having different ratios between the sheet thickness t of the first member 10 and the sheet thickness t' of the second member 20 from that of the model in FIG. 29(*a*). Simulation conditions except for the thickness ratios between the members 10, 20 are the same as those in the simulation (1).

Figure 33:
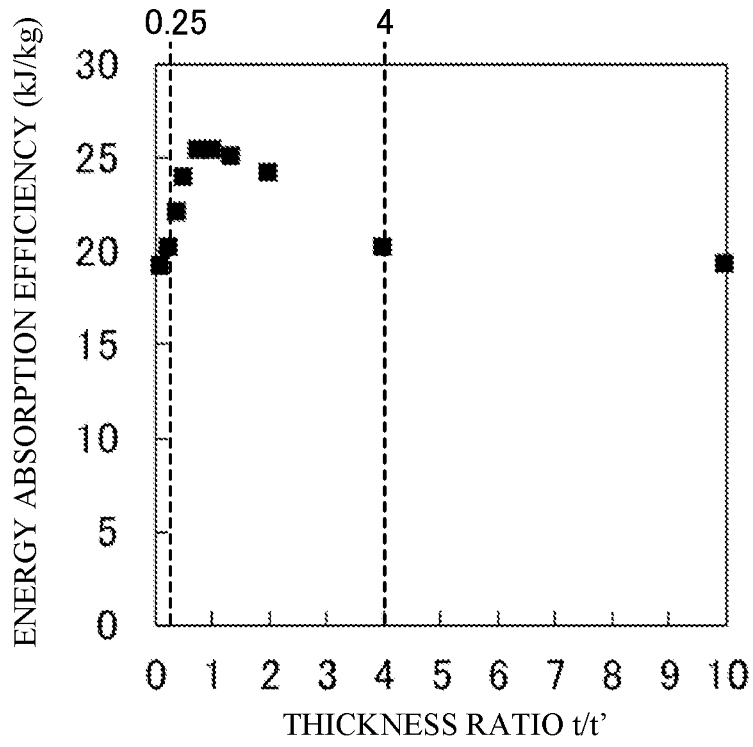
FIG. 33 is a chart illustrating energy absorption efficiencies of analysis models in a simulation (3).

FIG. 33 is a graph illustrating energy absorption efficiencies in applying a stroke of 200 mm to the end portions 10*a* of the first members 10. As illustrated in FIG. 33, as long as the thickness ratio t/t' between the first member 10 and the second member 20 is in a range of 0.25 to 4.0, the effect of improvement in energy absorption efficiency is large.

[Simulation (4)]

A simulation was carried out with models having different joint forms of the first member 10 and the second member 20 from that of the model in FIG. 29(*a*). Simulation conditions except for the joint forms of the members 10, 20 are the same as those in the simulation (1).

Figure 34:
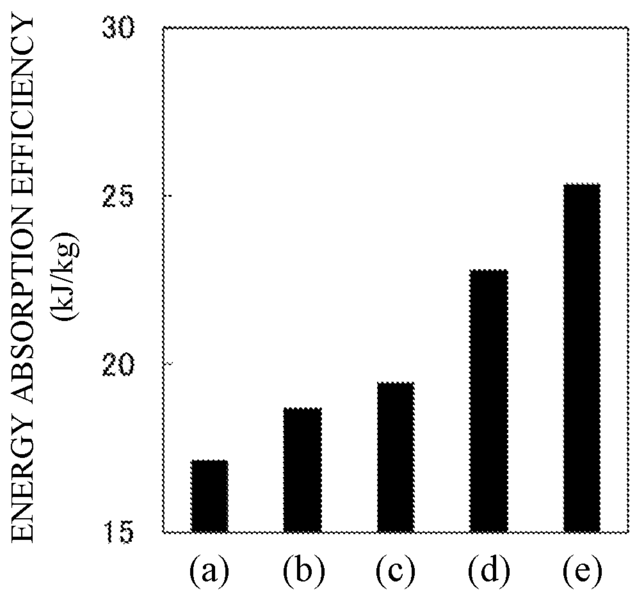
FIG. 34 is a chart illustrating energy absorption efficiencies of analysis models in a simulation (4).

FIG. 34 is a graph illustrating energy absorption efficiencies in applying a stroke of 200 mm to the end portion 10*a* of the first member 10. This simulation is carried out with the following models.

(a) a model only having the first member 10 in a cylindrical shape without having the second member 20

(b) a model in which the first member 10 and the second member 20 are in contact with, and are not joined to each other (c) a model in which only one joint line extending from the end portion 10*a* to the end portion 10*b* of the first member 10 is present (d) a model in which the above-described eight joint lines are present at regular intervals in a circumferential direction of the first member 10

(e) the model in FIG. 29(*a*) (joining over the entire surface of the first member 10 and the second member 20)

As illustrated in FIG. 34, when the first member 10 and the second member 20 are joined over their entire surface, the largest energy absorption efficiency is exhibited, and even only the one joint line in the axial direction further improves the energy absorption efficiency than the model without having the joint line.

[Simulation (5)]

Figure 35:
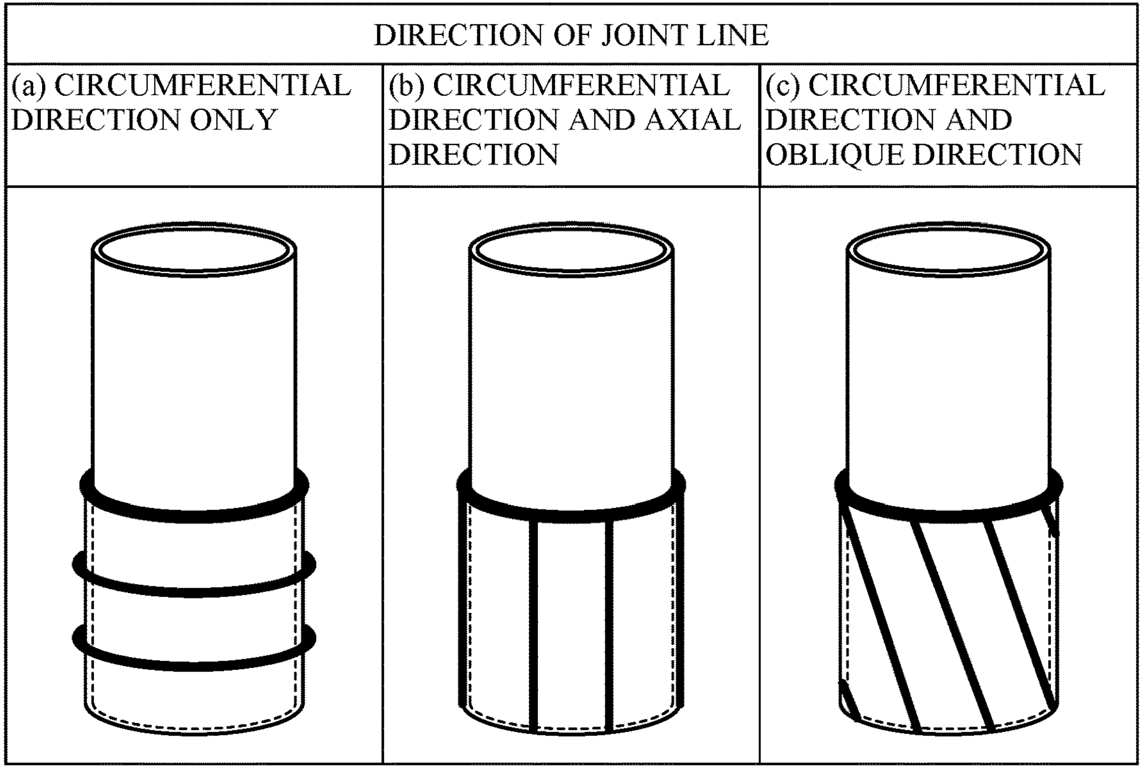
FIG. 35 are explanatory views illustrating analysis models in a simulation (5).

A simulation was carried out with models having different joint forms of the first member 10 and the second member 20 from that of the model in FIG. 29(*a*). As illustrated in FIG. 35, in this simulation, by broadly classifying the joint forms into (a) the form having joint lines only in a circumferential direction, (b) the form having joint lines in the circumferential direction and an axial direction, and (c) the form having joint lines in the circumferential direction and an oblique direction, a plurality of the models different in the number of joint lines were prepared in each of the forms. Simulation conditions except for the joint forms of the members 10, 20 are the same as those in the simulation (1).

Figure 36:
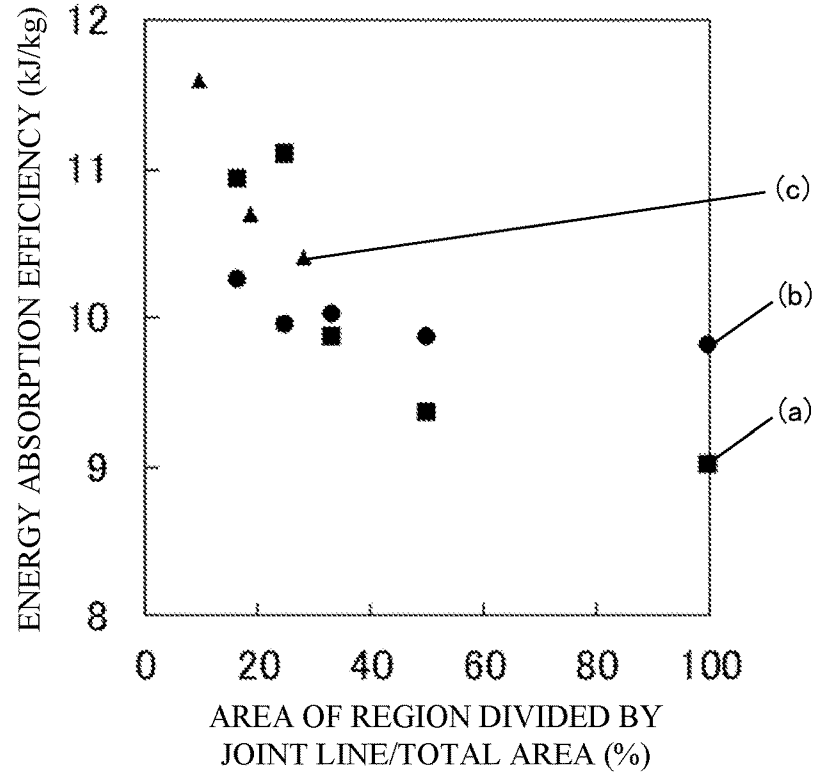
FIG. 36 is a chart illustrating energy absorption efficiencies of the analysis models in the simulation (5).

FIG. 36 is a graph illustrating energy absorption efficiencies in applying a stroke of 50 mm to the end portion 10*a* of the first member 10. A horizontal axis in FIG. 36 indicates a ratio between an area of each of regions divided by the joint lines in the second member 20 and the total area which is the total value of the areas of the regions. Note that in this simulation, the areas of the regions divided by the joint lines are equal to one another. As illustrated in FIG. 36, when the area of the divided region by the joint line is 60% or less of the total area, the energy absorption efficiency becomes large.

[Simulation (6)]

A simulation was carried out with models having different distances D between the end portions 10*a*, 10*b* of the first member 10 and the second member 20 from those of the models in FIG. 29(*a*) and FIG. 29(*c*). Simulation conditions except for the distances D between the end portions are the same as those in the simulation (1).

Figure 37:
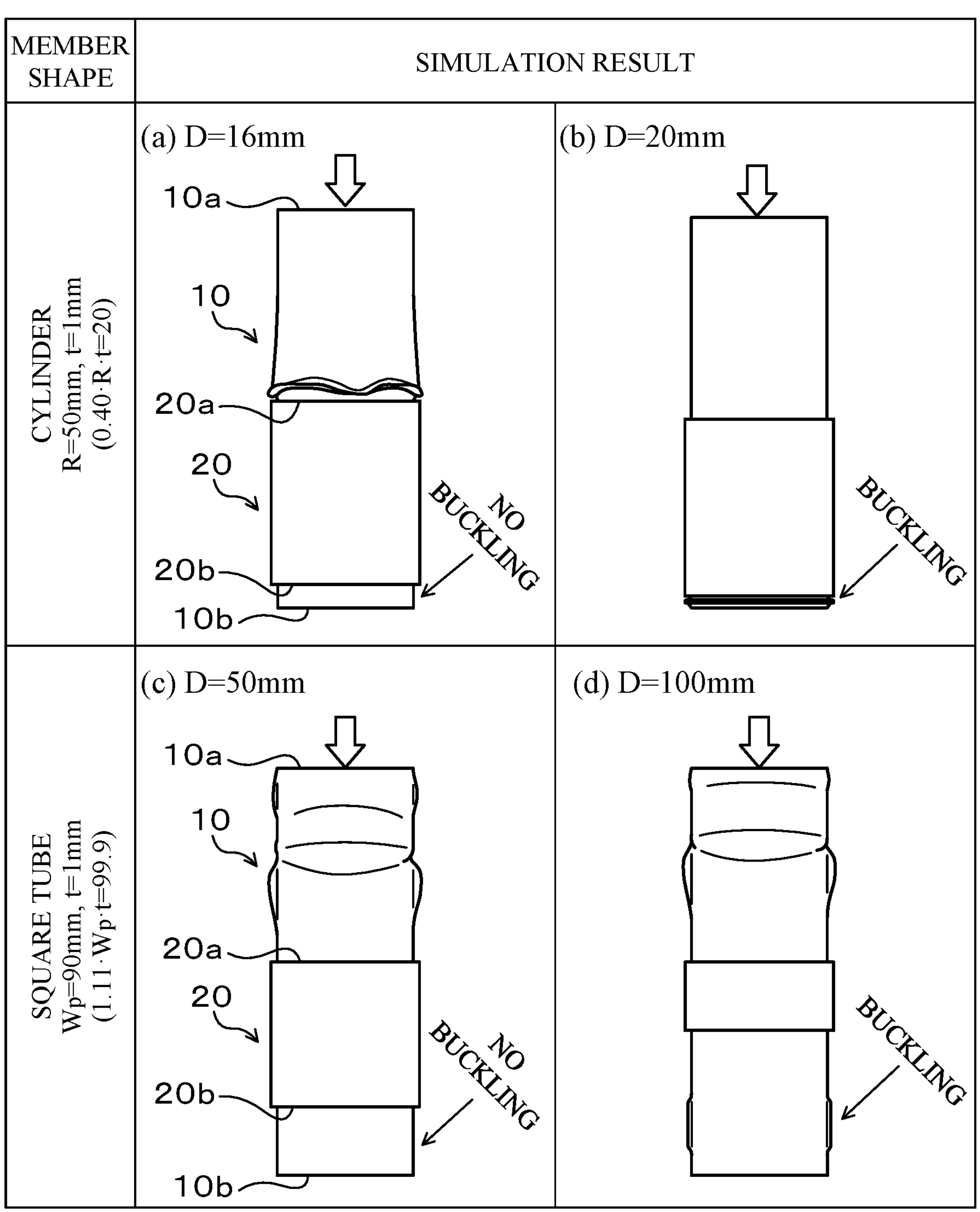
FIG. 37 are views illustrating deformed states of analysis models in a simulation (6).

FIG. 37 are views illustrating deformed states of the models in applying a stroke of 12 mm to the end portions 10*a* of the first members 10. According to set values of the maximum curvature radius R and the sheet thickness t of the first member 10 in the models in FIG. 37(*a*) and FIG. 37(*b*), a value of 0.40Rt indicating the upper limit of the distance D between the end portions described in the previously-described embodiment is 16. The model in FIG. 37(*a*) is a model satisfying $D<0.40Rt$ because the distance D between the end portions is 16. On the other hand, the model in FIG. 37(*b*) is a model not satisfying $D<0.40Rt$ because the distance D between the end portions is 20.

Further, in the model in FIG. 37(*b*), buckling occurred in the vicinity of the end portion 10*b* on the vehicle-interior side (passenger section side) before a region between the end portions 10*a*, 20*a* was subjected to sufficient axial crush deformation. Such occurrence of buckling in the vicinity of the end portion 10*b* has a possibility that the first member 10 is not subjected to sufficient axial crush deformation.

The models in FIG. 37(*c*) and FIG. 37(*d*) also had similar results, and in the model in FIG. 37(*d*) not satisfying $D<1.11W_pt$, buckling occurred in the vicinity of the end portion 10*b* before a region between the end portions 10*a*, 20*a* was subjected to sufficient axial crush deformation.

[Simulation (7)]

A simulation was carried out with models having different shapes of the second member 20 from that of the model in FIG. 29(*c*). Simulation conditions except for the shapes of the second member 20 are the same as those in the simulation (1).

FIG. 38 are views illustrating joint positions of the second members 20, and deformed states of the models in applying a stroke of 12 mm to the end portion 10*a* of the first member 10. As illustrated in FIGS. 38, in this simulation, the simulation is carried out with the models, in each of which the second members 20 in a plate shape are joined to flat surface portions of the first member 10, having different widths $W_p'$ of the second member 20 with respect to the width $W_p$ of the flat surface portion of the first member 10.

The model in FIG. 38(*b*) is deformed in a region closer to the end portion 10*a* of the first member 10 as compared with the model in FIG. 38(*c*). Thus, in the viewpoint of securing a larger plastic deformation region through the occurrence of deformation in the position closer to the end portion 10*a*, the width $W_p$' of the second member 20 joined to the flat surface portion is preferably a width of 30% or more of the width $W_p$ of the flat surface portion of the first member 10.

[Simulation (8)]

A simulation was carried out with models having different joint positions of the second member 20 from that of the model in FIG. 38(*a*). Simulation conditions except for the joint positions are the same as those in the simulation (1).

FIG. 39 is views illustrating the joint positions of the second member 20, and deformed states of the models in applying a stroke of 100 mm to the end portion 10*a* of the first member 10. As illustrated in FIG. 39, even though the second members 20 are not joined to all the flat surface portions of the first member 10, the occurrence of buckling in the vicinity of the end portion 10*b* of the first member 10 can be restrained to cause axial crush deformation from a region on the end portion 10*a* side.

[Simulation (9)]

A simulation was carried out with models having different shapes of the second members 20 from that of the model in FIG. 29(*c*). Simulation conditions except for the shapes of the second members 20 are the same as those in the simulation (1).

FIG. 40 are views illustrating joint positions of the second members 20, and deformed states of the models in applying a stroke of 100 mm to the end portion 10*a* of the first member 10. As illustrated in FIGS. 40, in this simulation, the simulation is carried out with the models, in each of which the second members 20 in a plate shape are joined to ridge line portions of the first member 10, having different lengths $W_r$' in the circumferential direction of the second members 20 with respect to the length $W_r$ in the circumferential direction of the ridge line portion of the first member 10.

As illustrated in FIGS. 40, in any of the models, the axial crush deformation appears from a region on the end portion 10*a* side without the occurrence of buckling in the vicinity of the end portion 10*b*. According to a result of this simulation, the length $W_r$' in the circumferential direction of the second member 20 joined to the ridge line portion is preferably a length of 15% or more of the length $W_r$ in the circumferential direction of the ridge line portion of the first member 10.

[Simulation (10)]

A simulation was carried out with models having different joint positions of the second member 20 from that of the model in FIG. 40(*a*). Simulation conditions except for the joint positions are the same as those in the simulation (1).

FIG. 41 is views illustrating the joint positions of the second member 20, and deformed states of the models in applying a stroke of 100 mm to the end portion 10*a* of the first member 10. As illustrated in FIG. 41, even though the second members 20 are not joined to all the ridge line portions of the first member 10, the occurrence of buckling in the vicinity of the end portion 10*b* of the first member 10 can be restrained to cause the axial crush deformation from a region on the end portion 10*a* side.

INDUSTRIAL APPLICABILITY

The present invention can be applied to, for example, a crash box, a side member, an extension of a subframe, or a reinforcement disposed in a hollow crushing member, of an automobile.

EXPLANATION OF CODES

1 impact absorbing structure
10 first member
10*a* end portion in axial direction
10*b* end portion in axial direction
10*c* sloped portion
10*d* flat surface portion
11 flat surface portion
12 ridge line portion
20 second member
20*a* end portion in axial direction
20*b* end portion in axial direction
20*c* sloped portion
20*d* flat surface portion
21 flat surface portion
30 joint line
50 crash box
51 side member
51*a*, 51*e* straight portion
51*b*, 51*d* bent portion
51*c* inclined portion
52 inner panel
60 crushing member
61 vehicle-exterior wall portion
62 vehicle-interior wall portion
A axial direction
C circumferential direction
D distance between end portions
L length in axial direction of first member
L' length in axial direction of second member
R maximum curvature radius
S area
$W_p$ width of flat surface portion of first member
$W_p$' width of region in which second member is joined
$W_r$ length in circumferential direction of ridge line portion of first member
$W_r$' length in circumferential direction of ridge line portion of region in which second member is joined
t sheet thickness of first member
t' sheet thickness of second member

The invention claimed is:

1. An impact absorbing structure of an automobile, comprising:
   - a first member composed of a metallic material; and
   - a second member joined to an outer surface or an inner surface of the first member, and extending in an axial direction of the first member, wherein:
   - a shape of the first member is a cylindrical shape;
   - a length of the second member in the axial direction of the first member is a length of 15 to 75% of a length in the axial direction of the first member;
   - the first member and the second member overlap each other over an overall length of the second member in the axial direction,
   - when a distance between end portions of the first member and the second member in the axial direction of the first member is set as D, a maximum curvature radius of the first member in a cross section perpendicular to the axial direction of the first member is set as R, and a sheet thickness of the first member is set as t, $0 \leq D < 0.40Rt$ is satisfied; and a joint line, extending along a direction different from a circumferential direction of the first member, of the first member and the second member is present.

2. The impact absorbing structure of the automobile according to claim 1, wherein a shape of the second member is a cylindrical shape.

3. The impact absorbing structure of the automobile according to claim 1, wherein an area of a region divided by the joint line in the second member is 60% or less of a total area of the regions.

4. An impact absorbing structure of an automobile, comprising:

a first member composed of a metallic material; and a second member joined to an outer surface or an inner surface of the first member, and extending in an axial direction of the first member, wherein:

a shape of the first member is a square tube shape;

a length of the second member in the axial direction of the first member is a length of 15 to 75% of a length in the axial direction of the first member;

the first member and the second member overlap each other over an overall length of the second member in the axial direction, when a distance between end portions of the first member and the second member in the axial direction of the first member is set as D, a width of a flat surface portion of the first member is set as $W_p$, and a sheet thickness of the first member is set as t, $0 \leq D < 1.11W_pt$ is satisfied; and a joint line, extending along a direction different from a circumferential direction of the first member, of the first member and the second member is present.

5. The impact absorbing structure of the automobile according to claim 4, wherein the second member is joined to the flat surface portion of the first member.

6. The impact absorbing structure of the automobile according to claim 4, wherein the second member is joined to a ridge line portion of the first member.

7. The impact absorbing structure of the automobile according to claim 1, wherein the joint line extends along the axial direction of the first member.

8. The impact absorbing structure of the automobile according to claim 1, wherein the joint line extends in a direction inclined to the axial direction of the first member.

9. The impact absorbing structure of the automobile according to claim 1, wherein another joint line extending along the circumferential direction of the first member is present.

10. The impact absorbing structure of the automobile according to claim 1, wherein a thickness ratio t/t' between the sheet thickness t of the first member and a sheet thickness t' of the second member is 0.25 to 4.0.

11. The impact absorbing structure of the automobile according to claim 1 used for a crash box, a side member, an extension of a subframe, or a reinforcement disposed in a hollow crushing member.

12. An impact absorbing structure of an automobile, comprising:

a first member comprising a metallic material; and a second member joined to an outer surface or an inner surface of the first member, and extending in an axial direction of the first member, wherein:

a shape of the first member is a cylindrical shape;

a length of the second member in the axial direction of the first member is a length of 15 to 75% of a length in the axial direction of the first member;

the first member and the second member overlap each other over an overall length of the second member in the axial direction, when a distance between end portions of the first member and the second member in the axial direction of the first member is set as D, a maximum curvature radius of the first member in a cross section perpendicular to the axial direction of the first member is set as R, and a sheet thickness of the first member is set as t, $0 \leq D < 0.40Rt$ is satisfied; and a joint line, extending along a direction different from a circumferential direction of the first member, of the first member and the second member is present.

13. An impact absorbing structure of an automobile, comprising:

a first member comprising a metallic material; and a second member joined to an outer surface or an inner surface of the first member, and extending in an axial direction of the first member, wherein:

a shape of the first member is a square tube shape;

a length of the second member in the axial direction of the first member is a length of 15 to 75% of a length in the axial direction of the first member;

the first member and the second member overlap each other over an overall length of the second member in the axial direction, when a distance between end portions of the first member and the second member in the axial direction of the first member is set as D, a width of a flat surface portion of the first member is set as $W_p$, and a sheet thickness of the first member is set as t, $0 \leq D < 1.11W_pt$ is satisfied; and a joint line, extending along a direction different from a circumferential direction of the first member, of the first member and the second member is present.

* * * * *